(12) United States Patent
Robinson et al.

(10) Patent No.: US 8,390,718 B2
(45) Date of Patent: Mar. 5, 2013

(54) METHODS AND SYSTEMS FOR PERFORMING VISUAL COLLABORATION BETWEEN REMOTELY SITUATED PARTICIPANTS

(75) Inventors: Ian N. Robinson, Pebble Beach, CA (US); W. Alex Vorbau, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 12/694,743

(22) Filed: Jan. 27, 2010

(65) Prior Publication Data

US 2010/0188478 A1 Jul. 29, 2010

Related U.S. Application Data

(63) Continuation-in-part of application No. 12/432,550, filed on Apr. 29, 2009, which is a continuation-in-part of application No. 12/321,996, filed on Jan. 28, 2009.

(51) Int. Cl.
*H04N 5/222* (2006.01)
*H04N 7/14* (2006.01)

(52) U.S. Cl. ............. 348/333.02; 348/14.01; 348/14.03; 348/14.1

(58) Field of Classification Search ............. 348/333.01, 348/333.02, 333.12, 14.01, 14.1, 14.03, 14.08, 348/14.16; 345/418, 592; 715/751, 759
See application file for complete search history.

(56) References Cited

U.S. PATENT DOCUMENTS

| | | | | |
|---|---|---|---|---|
| 5,025,314 A | * | 6/1991 | Tang et al. | 348/14.08 |
| 5,400,069 A | * | 3/1995 | Braun et al. | 348/14.16 |
| 5,666,155 A | * | 9/1997 | Mersereau | 348/14.01 |
| 5,801,758 A | * | 9/1998 | Heirich | 348/14.08 |
| 7,489,303 B1 | * | 2/2009 | Pryor | 345/173 |
| 7,710,391 B2 | * | 5/2010 | Bell et al. | 345/158 |
| 2002/0030637 A1 | * | 3/2002 | Mann | 345/8 |
| 2008/0094588 A1 | * | 4/2008 | Cole et al. | 353/122 |
| 2008/0184124 A1 | * | 7/2008 | Agarwal et al. | 715/733 |
| 2008/0298571 A1 | * | 12/2008 | Kurtz et al. | 379/156 |

* cited by examiner

*Primary Examiner* — Nhan T Tran

(57) ABSTRACT

Embodiments of the present invention are directed to a visual-collaborative systems and methods enabling geographically distributed groups to engage in face-to-face, interactive collaborative video conferences. In one aspect, a method for establishing a collaborative interaction between a local participant and one or more remote participants includes capturing images of the local participant in front of a display screen. The includes collecting depth information of the local participant located in front of the display screen and transmitting the images and depth information of the local participant to the one or more remote participants. The method also includes receiving images and depth information of the one or more remote participants and projecting the images of the one or more remote participants on the display screen based on the depth information of the remote participants.

20 Claims, 21 Drawing Sheets

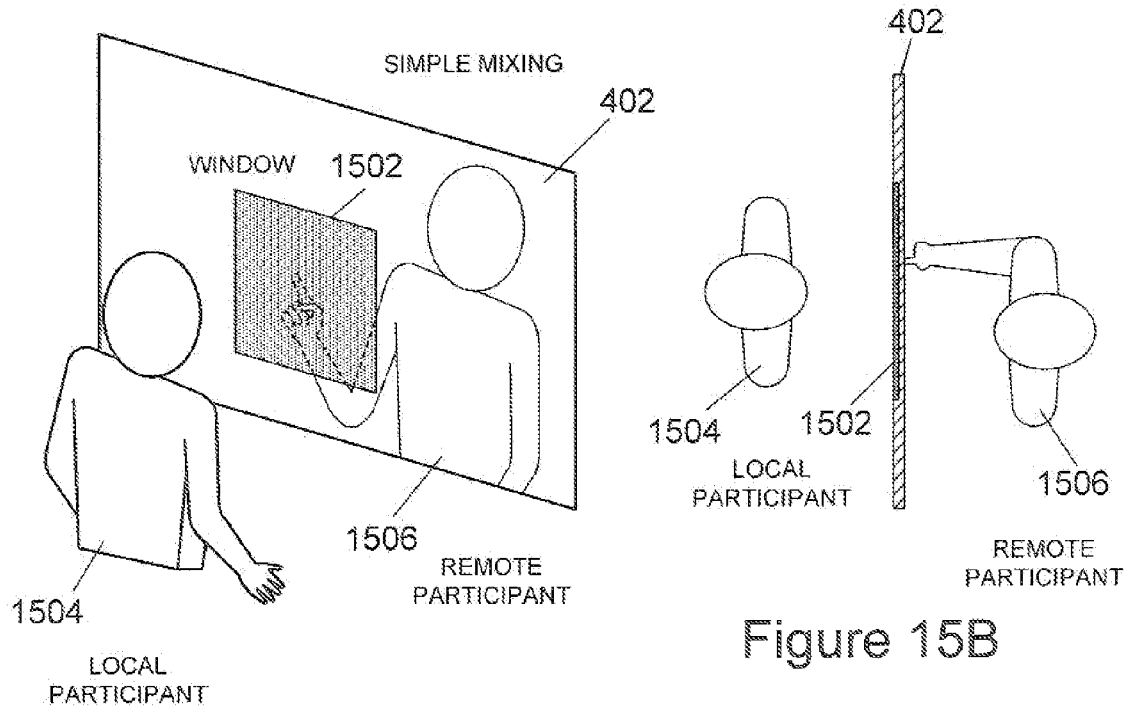
Figure 15A
Figure 15B
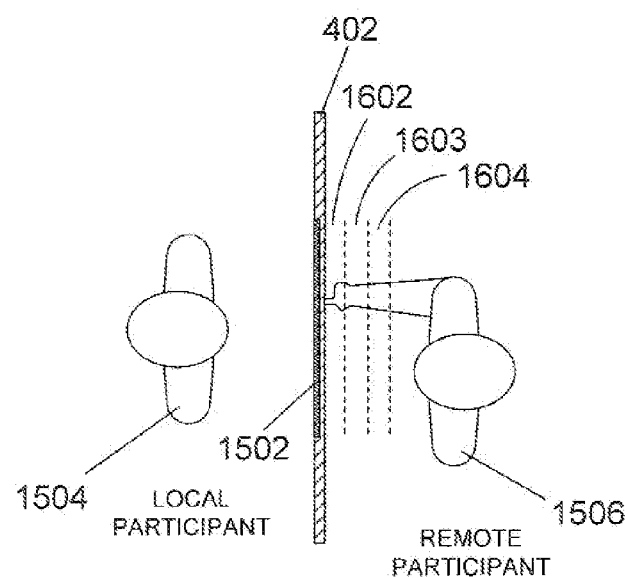

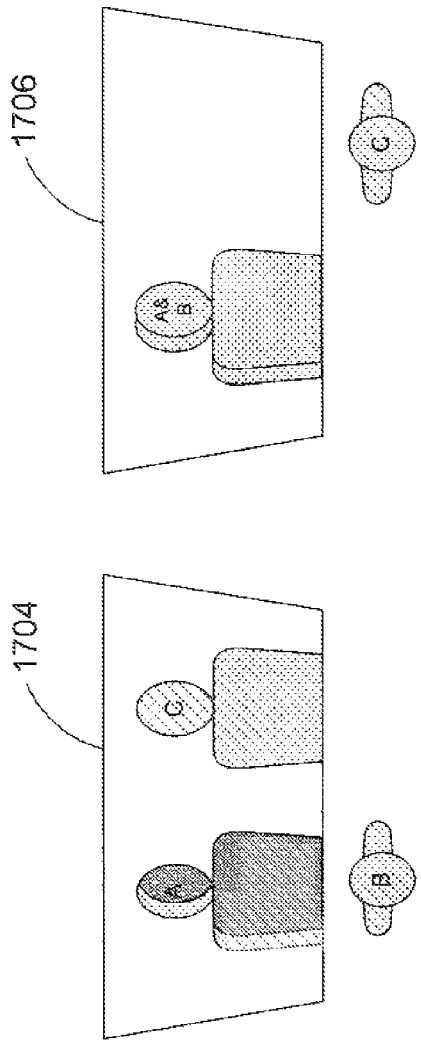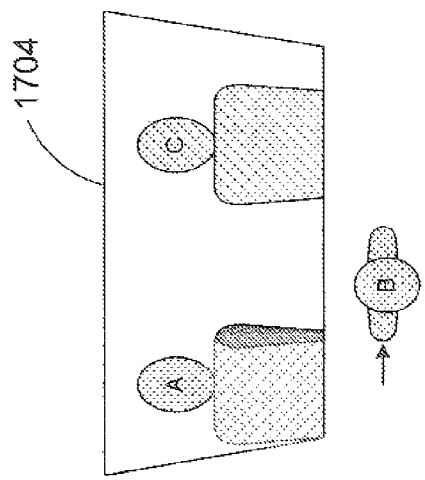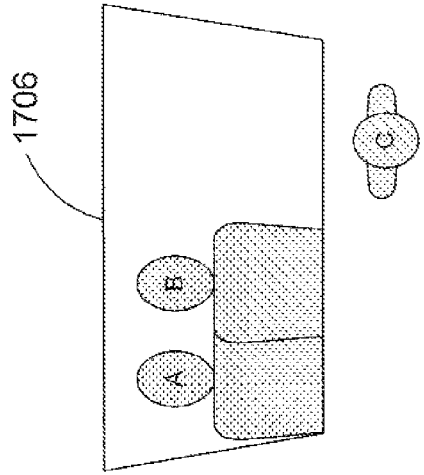
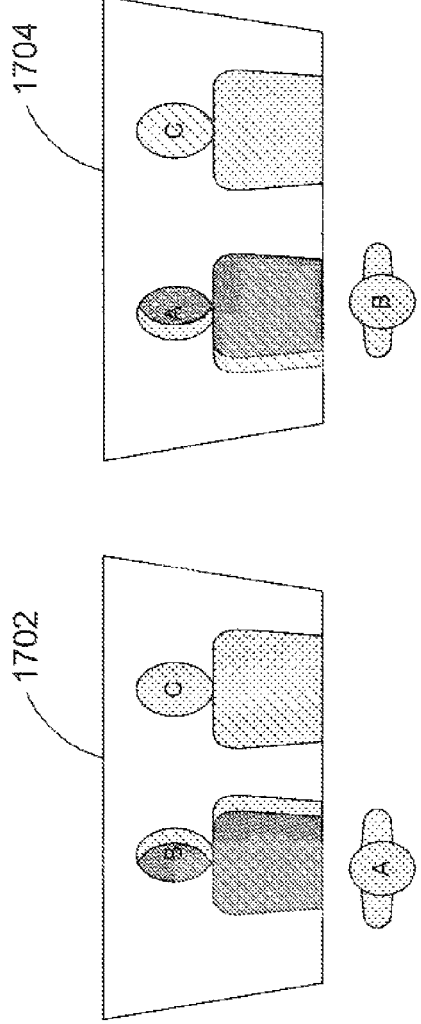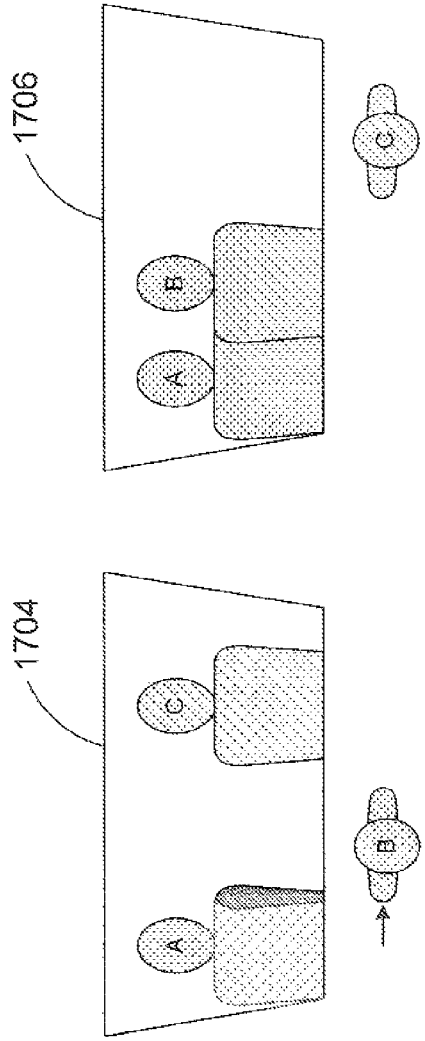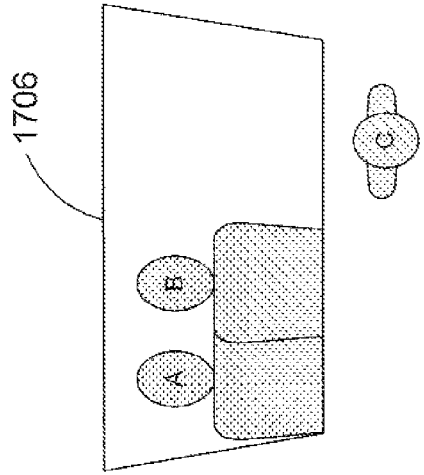
Figure 19A  Figure 19B  Figure 19C
Figure 19D  Figure 19E  Figure 19F

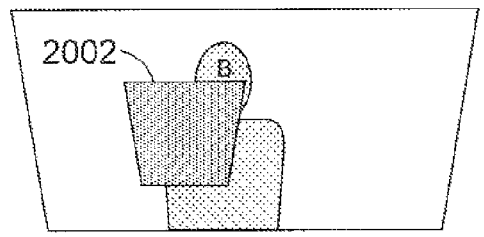
Figure 20A
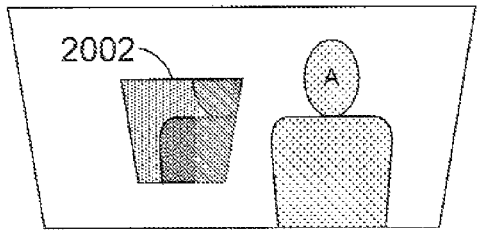
Figure 20B
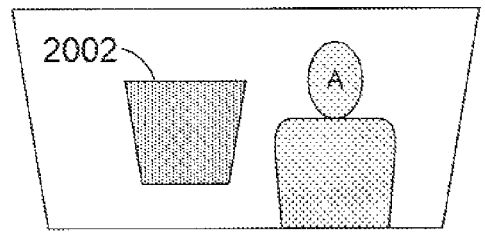
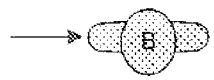
Figure 21A
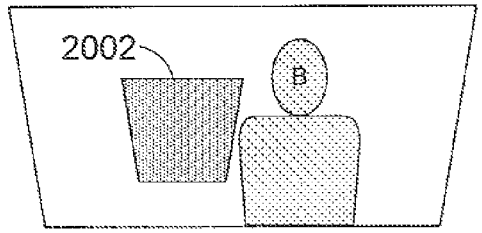
Figure 21B

METHODS AND SYSTEMS FOR PERFORMING VISUAL COLLABORATION BETWEEN REMOTELY SITUATED PARTICIPANTS

CROSS-REFERENCES TO RELATED APPLICATIONS

This application is a continuation-in-part of application Ser. No. 12/432,550 filed Apr. 29, 2009, which is a continuation-in-part of application Ser. No. 12/321,996, filed Jan. 28, 2009, both of which are hereby incorporated by reference in their entirety.

TECHNICAL FIELD

Embodiments of the current invention relate to remote collaboration systems.

BACKGROUND

Some of the most productive interactions in the workplace occur when a small group of people get together at a blackboard or a whiteboard and actively participate in presenting and discussing ideas. However it is very hard to support this style of interaction when participants are at different locations, a situation that occurs more and more frequently as organizations become more geographically distributed. To date, conventional video-conferencing systems are not well suited to this scenario. Effective collaboration relies on the ability for the parties to see each other and the shared collaboration surface, and to see where the others are looking and/or gesturing. Conventional video-conferencing systems can use multi-user screen-sharing applications to provide a shared workspace, but there is a disconnect from the images of the remote participants and the cursors moving over the shared application.

FIGS. 1-3 show schematic representations of systems configured to project images without interfering with images captured by a camera. FIG. 1 shows a communication medium with a half-silvered mirror 102, a camera 104 located above the mirror 102, and a projector 106. The mirror 102 and the projector 106 are positioned so that an image of a person or object located at a remote site is projected by the projector 106 onto the rear surface of the half-silvered mirror 102 and is visible to a participant 108. The camera 104 captures an image of the participant 108 via the participant's reflection in the mirror 102 and transmits the image to another person. The configuration of mirror 102, projector 106, and camera 104 enable the participant 108 to have a virtual face-to-face interaction with the other person. However, close interaction between the participant 108 and the other person can be disconcerting because the tilted screen makes for unnatural views of the remote user. FIG. 2 shows a communication medium with a switchable diffusing screen 202, a camera 204, and a projector 206. The screen 202 can be composed of a material that can be cycled rapidly between diffusive and transparent states. The state of the screen 202, projector 206, and camera 204 can be synchronized so that the projector 206 projects images when the screen is diffusive and the camera 204 captures images when the screen in transparent. However, it is difficult to design a screen that can switch fast enough to avoid flicker, and the need to synchronize these fast switching components adds to the complexity of the system and limits the projected and captured light levels. FIG. 3 shows a top view of a communication medium with two cameras 302 and 304 on each side of a display 306. Images of a participant 308, for example, are captured by the cameras 302 and 304 and processed to create a single image of the participant 308 which appears to be captured by a single virtual camera 310 for viewing by another person at a different location. However, an image captured in this manner typically suffers from processing artifacts, especially when the captured views are at a very different angle from the intended virtual view, as would be the case with a participant located close to a large screen. This system also fails to capture hand gestures near, or drawing on, the screen surface.

It is desirable to have visual-collaborative systems that project images without interfering with and diminishing the quality of the images simultaneously captured by a camera.

BRIEF DESCRIPTION OF THE DRAWINGS

FIGS. 15A-15B show mixing of video content from two or more image sources in accordance with one or more embodiments of the present invention.

FIG. 16 shows a top view of an interaction perceived by a video-collaboration participant in accordance with one or more embodiments of the present invention.

FIGS. 19A-19C show visual cues used to identify overlapping remote participants in accordance with one or more embodiments of the present invention.

FIGS. 19E-19F show participants repositioned to avoid overlap in accordance with one or more embodiments of the present invention.

FIGS. 20A-20B each show an arrangement of two video conference participants located at different sites in accordance with embodiments of the present invention.

FIGS. 21A-21B show a participant repositioned to avoid overlap with a shared content window in accordance with one or more embodiments of the present invention.

DETAILED DESCRIPTION

Embodiments of the present invention are directed to visual-collaborative systems and methods enabling geographically distributed groups to engage in face-to-face, interactive collaborative video conferences. The systems include a projection display screen that enables cameras to capture images and depth information of the local objects through the display screen and send the images to a remote site. In addition, the display screen can be used to simultaneously display images from the remote site.

Figure 1:
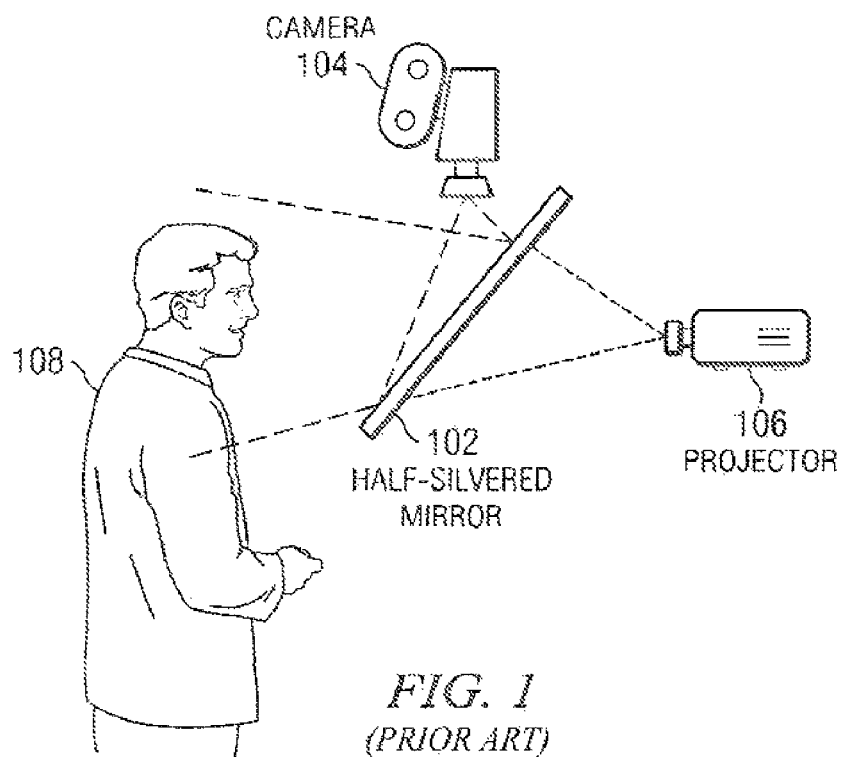
FIGS. 1-3 show schematic representations of systems configured to project images without interfering with images captured by a camera.
Figure 2:
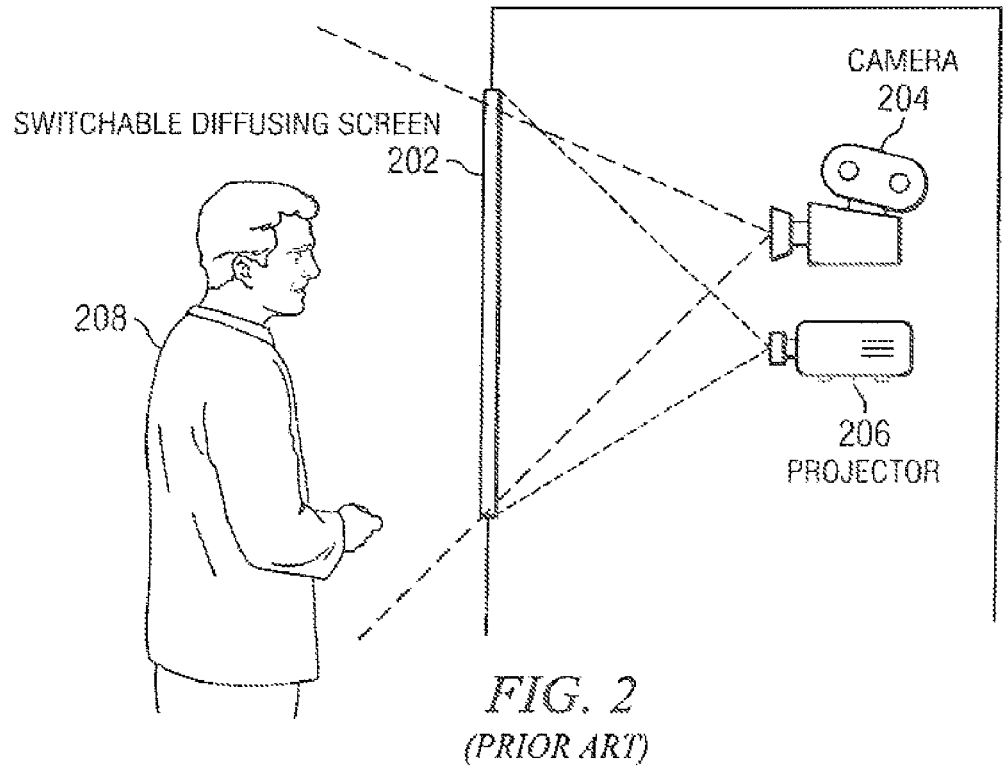
Figure 3:
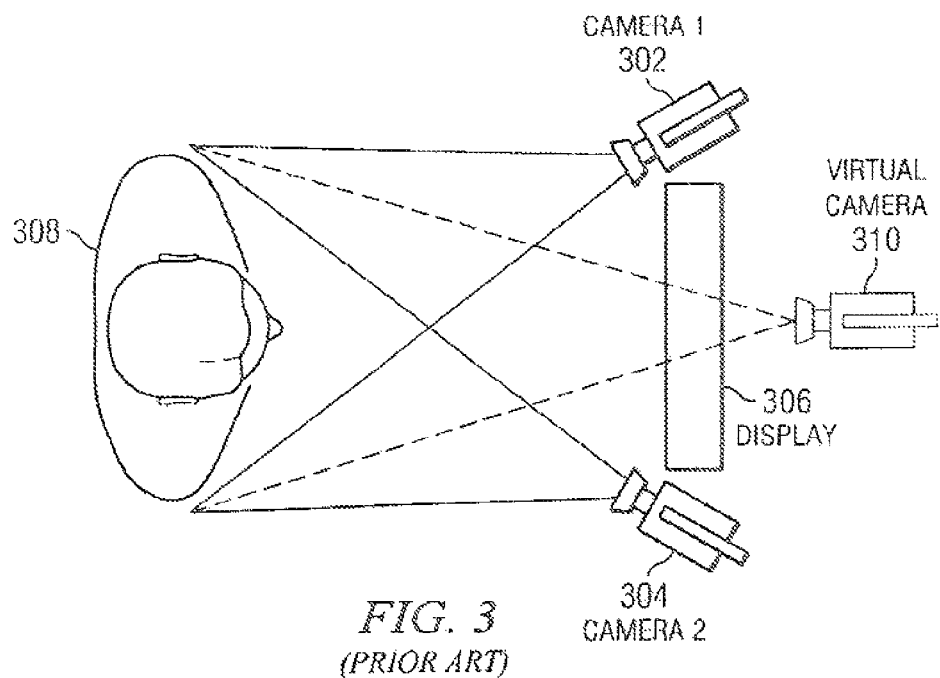
Figure 4:
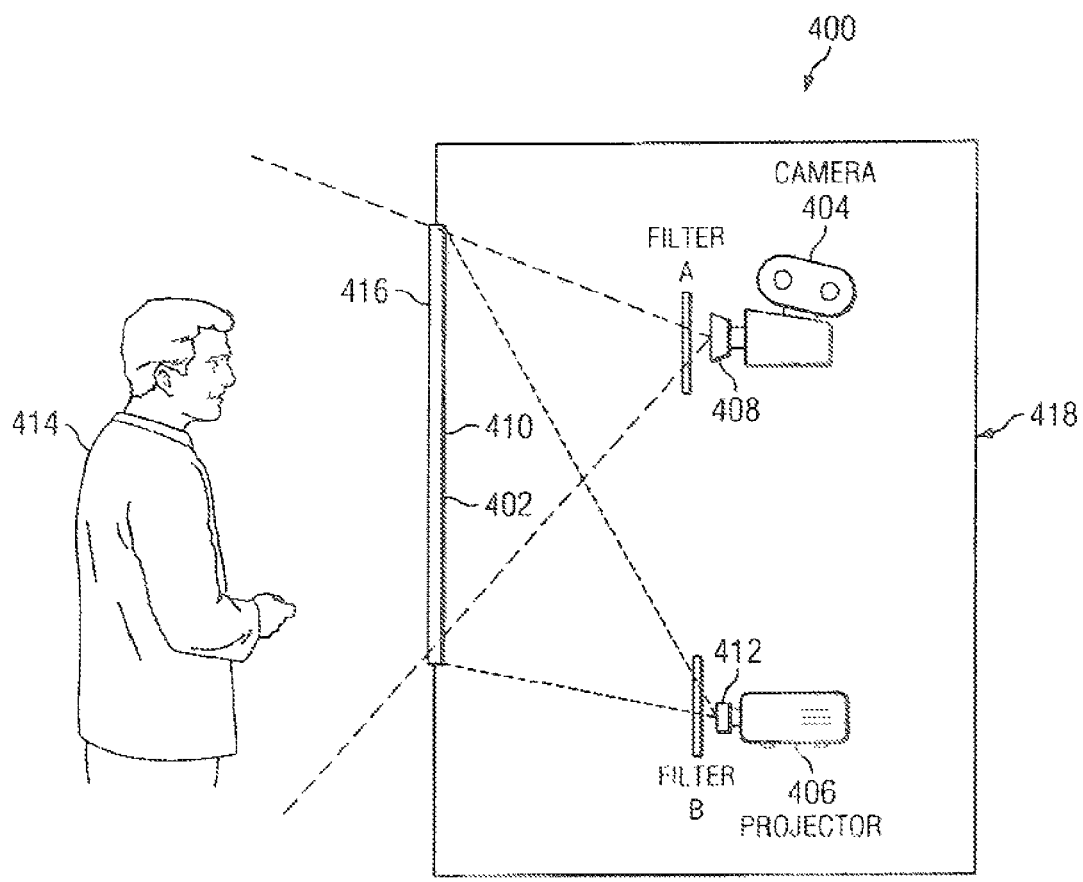
FIG. 4 shows a schematic representation of a first visual-collaborative system configured in accordance with one or more embodiments of the present invention.

FIG. 4 shows a schematic representation of a visual-collaborative system 400 configured in accordance with one or more embodiments of the present invention. The system 400 comprises a display screen 402, a camera 404, and a projector 406 and includes a filter A disposed between the camera lens 408 and the screen 402 and a filter B disposed between the projector lens 412 and the screen 402. The camera lens 408 and projector lens 412 are positioned to face the same first surface 410 of the display screen 402. In the embodiments described in FIGS. 4-9, the screen 402 is a rear projection display screen. However, the rear projection implementation shown is for purposes of example only and the screen 402 may also be a front projection display screen. A front projection implementation is shown in FIGS. 10-13.

Referring to FIG. 4, the screen 402 is a rear projection display screen comprising a screen material that diffuses light striking the first surface 410 within a first range of angles. The projector 406 is positioned to project images onto the first surface 410 within the first range of angles. A participant 414 facing the outer second surface 416 of the screen 402 sees the images projected onto the screen 402 from the projector 406. The screen 402 is also configured to transmit light scattered from objects facing the second surface 416. In other words, the camera lens 408 is positioned to face the first surface 410 so that light scattered off of objects facing the second surface 416 pass through the display screen and is captured as images of the objects by the camera 404.

In certain embodiments, the display screen 402 comprises a relatively low concentration of diffusing particles embedded within a transparent screen medium. The low concentration of diffusing particles allows a camera 404 to capture an image through the screen (providing the subject is well lit), while diffusing enough of the light from the projector 406 to form an image on the screen. In other embodiments, the display screen 402 can be a holographic film that has been configured to accept light from the projector 406 within a first range of angles and transmit light that is visible to local participant 1504 within a different range of viewing angles. The holographic film is otherwise transparent. In both embodiments, light projected onto the first surface 410 within the first range of angles can be observed by viewing the second surface 416, but light striking the second surface 416 is transmitted through the screen 402 to the camera. However, in both embodiments the camera 404 also captures light from the projector 406 diffused or scattered off the first surface 410.

In order to prevent ambient light from striking the first surface 410 of the screen 402 and reducing the contrast of the projected and captured images, the system 400 may also include a housing 418 enclosing the camera 404 and projector 406. The housing 418 is configured with an opening enclosing the boundaries of the screen 402 and is configured so that light can only enter and exit the housing 418 through the screen 402.

As shown in FIG. 4, filters A and B are positioned so that light output from the projector 406 passes through filter B before striking the first surface 410 and light captured by the camera 404 passes through filter A. The filters A and B are configured to prevent light produced by the projector 406 and scattered or diffused from the screen 402 from interfering with light transmitted through the screen 402 and captured by the camera 404. In one embodiment, this is achieved using complementary filters to block different components of light. In one embodiment, filter A passes through light that would be blocked by filter B. Similarly, filter B passes light that would be blocked by filter A. In this way, light from the projector 406 that is diffused or scattered off the first surface may be blocked.

This implementation (filter A passing light blocked by filter B and filter B passing light blocked by filter A) is implemented in FIG. 4 where the camera system includes a first filter (filter A) that is disposed between the camera and the first surface of the display screen. Filter A passes the light received by the camera, except for the light produced by the projector (which it blocks). A second filter (filter B) disposed between the light source of the projector and the projection surface of the display screen, wherein the second filter passes light output by the projector that is blocked by the first filter.

If the material used for the display screen 402 maintains polarization of scattered light, and if the projectors used are the type which result in no polarization of the light output from the projectors, then polarized filters may be used. In one embodiment, the complementary filters A and B are polarizing filters, where polarizing filter A has a first direction of orientation that is different than the direction of orientation of polarizing filter B. In one embodiment, the filters are circularly polarized, where the polarization for one filter is right circularly polarized and the polarization for the other filter is left circularly polarized. In one embodiment, the two filters are polarized linearly. In this embodiment, one filter is polarized horizontally while the other filter is polarized vertically.

Although the term blocked is used throughout the application, it is realized that in some cases a filter might not block 100% of the light of the complementary filter so that the filters are completely non-overlapping. However, when the filters are non-overlapping, the best performance is typically achieved. For example, in the embodiment where the filters are linearly polarized with one filter (assume for purposes of example filter A) is polarized horizontally and the other filter (filter B) is polarized vertically, preferably, the direction of orientation of the filters is orthogonal to each other. In this implementation, the filters are non-overlapping and filter A blocks light that would not be blocked by filter B and filter B blocks light that would not be blocked by filter A. Although orientations other than a 90 degree orthogonal positioning may be used, this is not desirable since as the orientation of the two filters moves further away from it's orthogonal positioning, relative to each other, the further the system performance is decreased.

For purposes of example, assume that filter A is positioned at an 88 degree angle relative to filter B (as opposed to the preferred 90 degree positioning.) Although the filters are not completely non-overlapping, typically the filter arrangement would still provide a configuration that would substantially block light from the complementary filter such that performance is not noticeably degraded to the participant (as compared to the 90 degree orthogonal positioning). The degree to which the images are visually degraded is to some extent a function of the media content and the environment (brightness, etc) of the participants. For example, if the media content includes a black and white checkerboard image (high brightness for white image and high contrast), an 88 degree relative positioning may not be sufficiently non-overlapping to provide an image that is not noticeably degraded. In contrast, if the media content is relatively dark compared to the checkerboard content or the participant is an a low light environment for example, an 88 degree relative positioning of the filter may provide little if any noticeable degradation by the participant. Thus for this case, the 88 degree relative position which substantially blocks (but not completely blocks) the light produced by the projector results in minimum degradation of performance. Thus "block" and "substantially blocked" may be used interchangeable as long as difference in blocking results in visual degradation that is either minimal or not apparent to the participant. Light that is "substantially blocked" by a filter may correspondingly be "substantially transmitted" by it's complementary filter.

As previously noted, it is desirable for the filters A and B to be configured to prevent light produced by the projector and scattered or diffused from the screen 402 from interfering with light transmitted through the screen 402 and captured by the camera 404. In the embodiment previously described, this is accomplished using a first type of filter, a polarized filter. However, other types of filters may be used. In an alternative embodiment, this can be achieved using a second type of filter, a wavelength division filter.

In particular, filter B can be configured to transmit a first set of wavelengths ranges that when combined create the visual sensation of a much broader range of colors in projecting images on the display screen 402, and filter A can be configured to transmit a second set of wavelength ranges that are different from the first set of wavelength ranges. The second set of wavelength ranges can also be used to create the visual sensation of a much broader range of colors. In other words, filter A is configured and positioned to block the wavelength ranges that are used to create images on the display screen 402 from entering the camera lens 408. Even though the wavelength ranges used to produce images viewed by local participant 1504 are different from the wavelengths of light used to capture images by the camera 404, the projector 406 can still use the colors transmitted through filter B to project full color images and light transmitted through filter A and captured by the camera 404 can still be used to record and send full color images. It is the component wavelengths of the light used to project and capture the full color images that are prevented from interfering. Similar to the descriptions with respect to polarized filters, wavelength division filters may not completely be non-overlapping so that a filter may substantially block a set of wavelength ranges.

Figure 5:
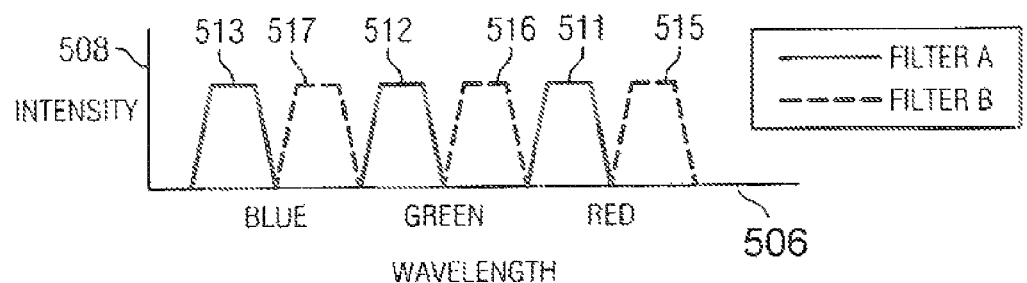
FIG. 5 shows a plot of exemplary wavelength ranges over which two filters transmit light in accordance with one or more embodiments of the present invention.

FIG. 5 shows exemplary plots 502 and 504 of wavelength ranges over which filters A and B, respectively, can be configured to transmit light in accordance with one or more embodiments of the present invention. Axis 506 represents the range of wavelengths comprising the visual spectrum. Axis 508 represents intensities of light transmitted through filters A and B, respectively. As shown in FIG. 5, the red, green and blue portions of the spectrum are each split into two halves with curves 511-513 representing relatively shorter wavelength rangers of the red, green, and blue portions of visible spectrum transmitted through filter A and curves 515-517 representing relatively longer wavelength ranges of the red, green, and blue portions of visible spectrum transmitted through filter B. As shown in FIG. 5, filters A and B do not transmit the same wavelength ranges of the red, green, and blue portions of the visible spectrum. In particular, filter A is configured to transmit shorter wavelength ranges of the red, green, and blue portions of the visible spectrum, and substantially block the longer wavelength ranges of the red, green, and blue portions of the spectrum. In contrast, filter B is configured to transmit the longer wavelength ranges of the red, green, and blue portions of the visible spectrum and substantially block the short wavelength ranges of the red, green, and blue portions of the visible spectrum. Both sets of red, green, and blue wavelengths can be treated as primary colors that can be combined to produce a full range of colors in projecting images on the display screen 402 and capturing images through the display screen 402. Thus, the combination of filters A and B effectively block the light used to project color images on the display screen 402 form being back scattered and interfering with the color images captured by the camera 404.

In other embodiments, operation of the filters A and B can be reversed. In other words, filter A can transmit the longer wavelength ranges of the red, green, and blue portions of the visual spectrum while filter B transmits the shorter wavelength ranges of the red, green, and blue portions of the visible spectrum.

Figure 6:
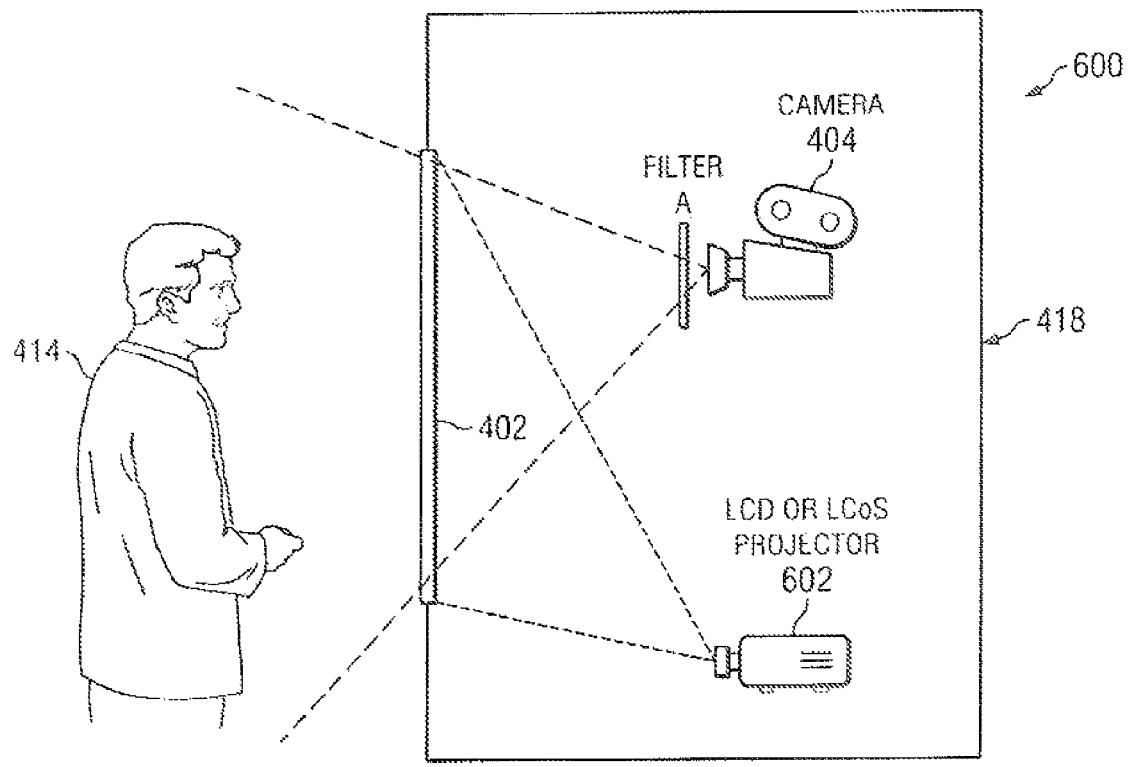
FIG. 6 shows a schematic representation of a second visual-collaborative system configured in accordance with one or more embodiments of the present invention.

FIG. 6 shows a visual-collaborative system 600 configured in accordance with one or more embodiments of the present invention. The system 600 is nearly identical to the system 400 except filter B and the projector 406 are replaced with a single projector 602 configured to project color images using wavelength ranges that are blocked by filter A. For example, the projector 602 can be a conventional projector using three microdisplays and color splitting optics that send red, green and blue light from the projector bulb to the corresponding display. The microdisplays can be well-known liquid crystal display ("LCD"), liquid crystal on silicon ("LCoS"), or digital-micromirror device ("DMD") technologies. In such a system, the functionality of filter B can be incorporated into the color splitting optics within the projector 602. Filter A is configured to transmit wavelength ranges other than the wavelengths reflected by the color splitter, as described above with reference to FIG. 5. For example, the internal color splitter can be a series of dichroic mirrors that each reflects one of the primary colors to a separate microdisplay, while passing other wavelengths of light. Each reflected color is modulated by the corresponding microdisplay, and the colors are recombined to produce images that are projected onto the first surface 410. Each microdisplay provides pixelized control of the intensity of one color. The colors not reflected by the color splitter are discarded. For example, in order to produce a red object, the microdisplays corresponding to projecting green and blue light are operated to block green and blue light from passing through the projector 602 lens.

In other embodiments, the lamp producing white light and the internal color splitter of the projector 602 can be replaced by separate lasers, each laser generating a narrow wavelength range of light that when combined with appropriate intensities produce a full range of colors. For example, the lamp and internal color splitter can be replaced by three lasers, each laser generating one of the three primary colors, red, green, and blue. Each color produced by a different laser passes through a corresponding LCD or is reflected off of a corresponding LCoS and the colors are recombined within the projector 602 to project full color images onto the first surface 410. Note that the use of a relatively narrow set of wavelengths at the projector allows the complementary set of wavelengths passed by filter A to be relatively broader, allowing more light into the captured image.

In other embodiments the function of filter A could be incorporated into the camera optics. For example the color filter mosaic that forms part of a camera's image sensor could be selected to pass only selected wavelengths.

Figure 7A:
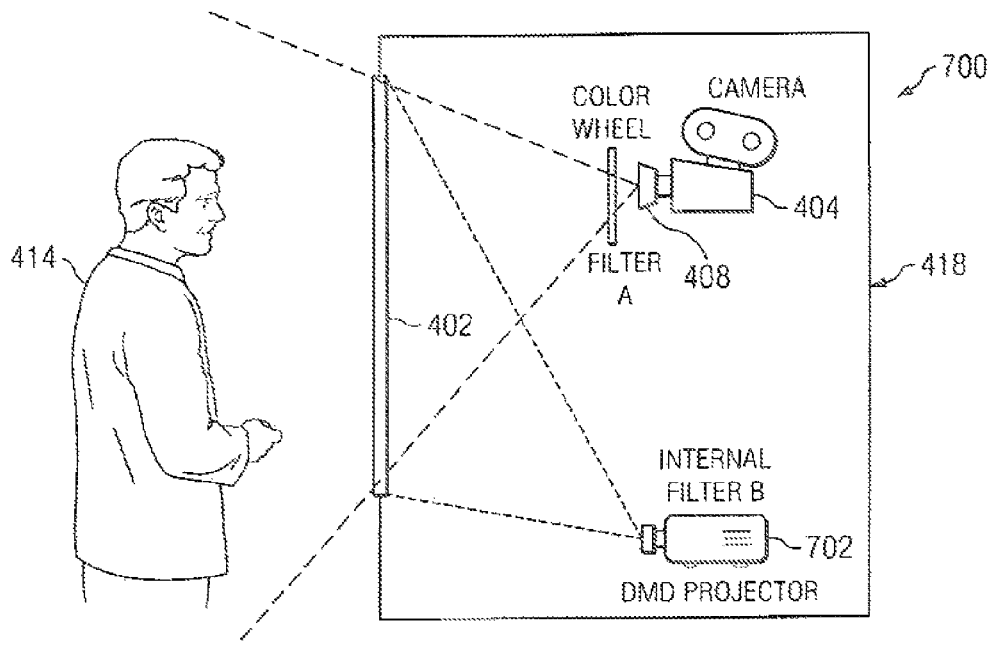
FIG. 7A shows a schematic representation of a third visual-collaborative system configured in accordance with one or more embodiments of the present invention.
Figure 7B:
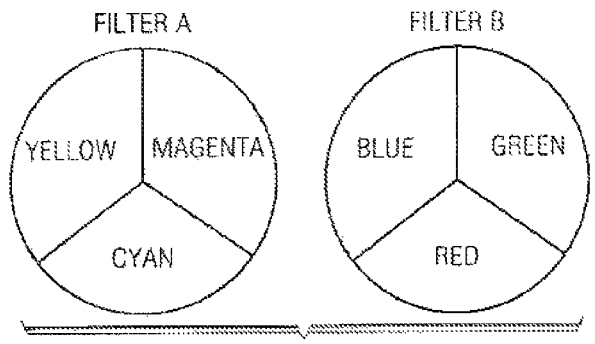
FIG. 7B shows two color wheels configured in accordance with one or more embodiments of the present invention.

FIG. 7A shows a visual-collaborative system 700 configured in accordance with one or more embodiments of the present invention. The system 700 is nearly identical to the system 400 except filter B and the projector 406 are replaced with a sequential color projector 702. An example of such a projector is a "DMD projector" that includes a single digital micromirror device and a color wheel filter B comprising red, green, and blue segments. The color wheel filter B spins between a lamp and the DMD, sequentially adding red, green, and blue light to the image displayed by the projector 702. Also, filter A is replaced by a second color wheel filter A which contains filters that transmit complementary colors to those of filter B. For example, as shown in FIG. 7B, the color wheel filter A can use cyan, yellow, and magenta transparent color panels to sequentially block the color being projected through the color wheel filter A. Color wheel filters A and B can be synchronized so that when the color wheel filter A transmits one color the color wheel filter B transmits a complementary color. For example, when the red panel of the color wheel filter B passes between the lamp and the DMD of the projector 702, the color red is projected onto the screen 402 while the cyan panel of the color wheel filter A covers the lens 408 enabling the camera 404 to capture only green and blue light and ignore the projected red light.

Figure 7C:
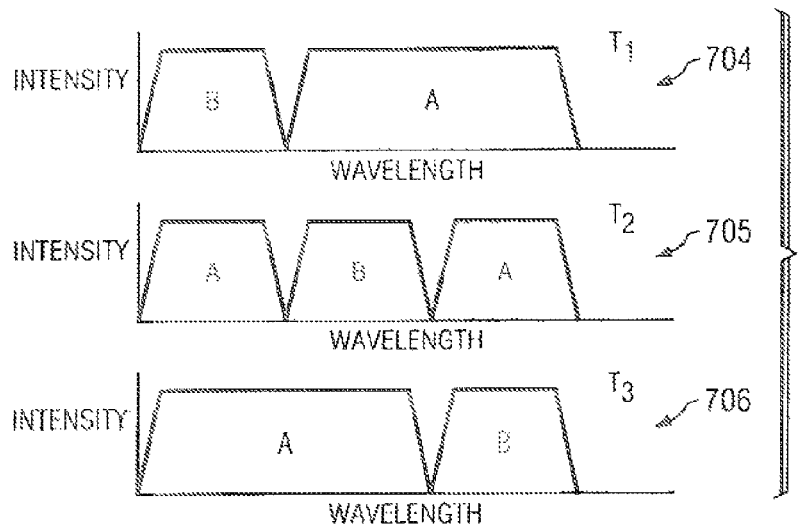
FIG. 7C shows plots of exemplary wavelength ranges over which two filters transmit light in accordance with one or more embodiments of the present invention

FIG. 7C shows exemplary plots 704-706 of wavelength ranges over which color wheel filters A and B, respectively, can be operated to transmit light in accordance with one or more embodiments of the present invention. Plot 704 shows that at a first time $T_1$, filter B passes a different range of wavelengths than filter A. Plot 705 shows that at a later second time $T_2$, filter B passes a range of wavelengths sandwiched between two different wavelength ranges passed by filter A. Plot 706 shows that at a later time $T_3$, filter B again passes a different range of wavelengths than filter A. In other words, plots 704-706 reveal that at any given time, filters A and B are operated to pass different wavelength ranges. Plots 704-706 also reveal that filters A and B can be operated to pass wavelengths over the same wavelength ranges, but not at the same time.

Figure 8:
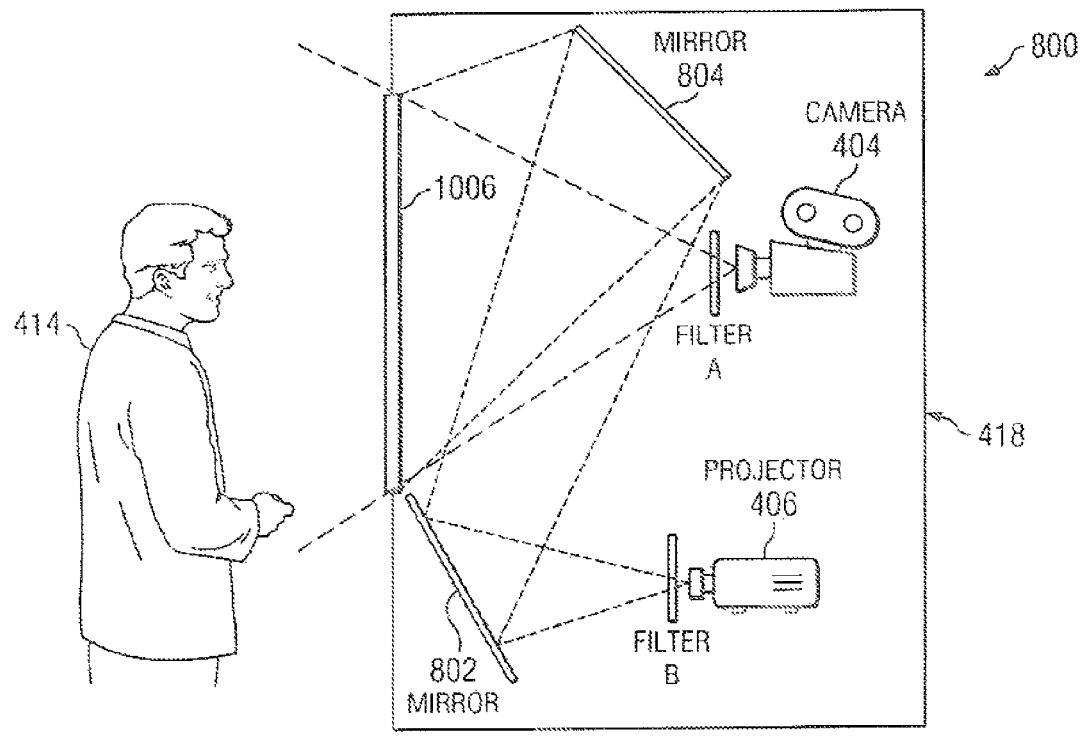
FIG. 8 shows a schematic representation of a sixth visual-collaborative system configured in accordance with one or more embodiments of the present invention.

In still other embodiments, the housing 418 can include fully reflective mirrors that reflect projected images onto a display screen within the range of angles for which the screen is diffusive. FIG. 8 shows a visual-collaborative system 800 configured in accordance with one or more embodiments of the present invention. The system 800 is nearly identical to the system 400 except mirrors 802 and 804 are included to reflect images produced by the projector 406 onto a display screen 806 within a range of angles for which the screen 806 is diffusive.

Figure 9:
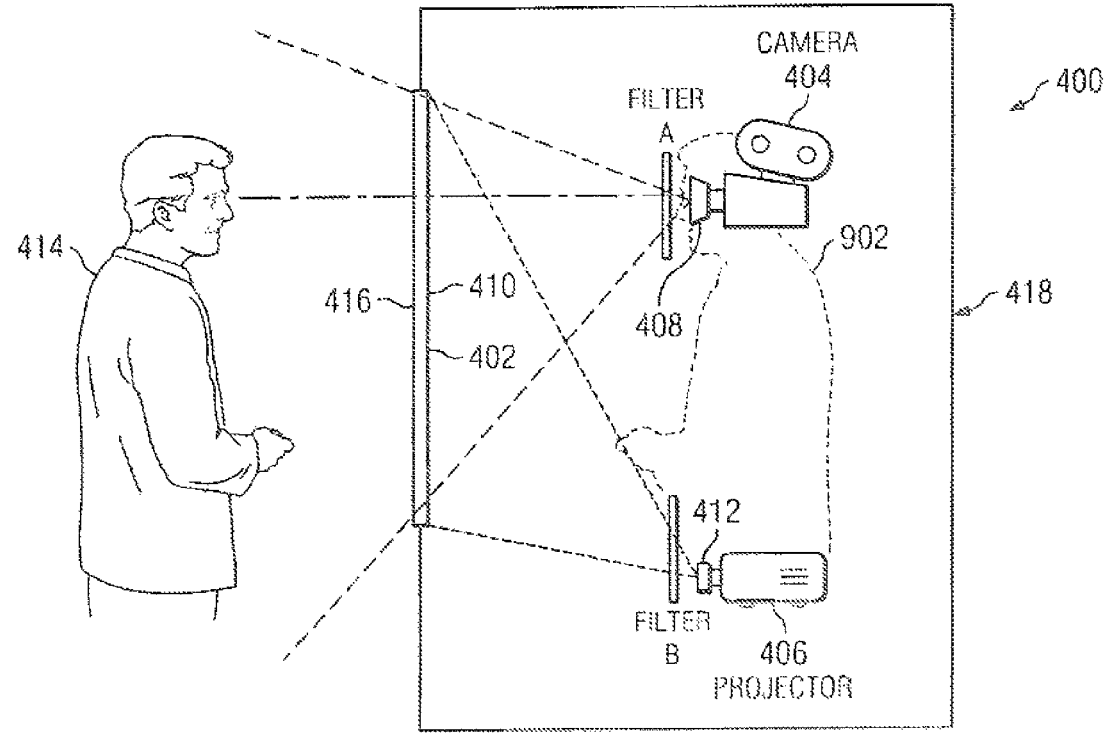
FIG. 9 shows a camera positioned at approximately eye level to a participant in accordance with one or more embodiments of the present invention.

The visual-collaborative systems described above with reference to FIGS. 4-8 can be used in interactive video conferencing. The camera 404 and projector 406 can be positioned so that the display screen 402 acts as a window to a remote site. This can be accomplished by positioning the camera 404 at approximately eye level to local participant 1504 facing the second surface 416 and at approximately the same distance local participant 1504 would feel comfortable standing away from the screen. FIG. 9 shows the camera 404 positioned at approximately eye level to local participant 1504 in accordance with one or more embodiments of the present invention. As a result, local participant 1504 appears face-to-face with a second participant represented by dashed-line FIG. 902 located at a remote site. The second participant 902 and local participant 1504 can engage in an interactive, virtual, face-to-face conversation with the display screen 402 serving as a window through which the second participant and local participant 1504 can clearly see each other.

Figure 10:
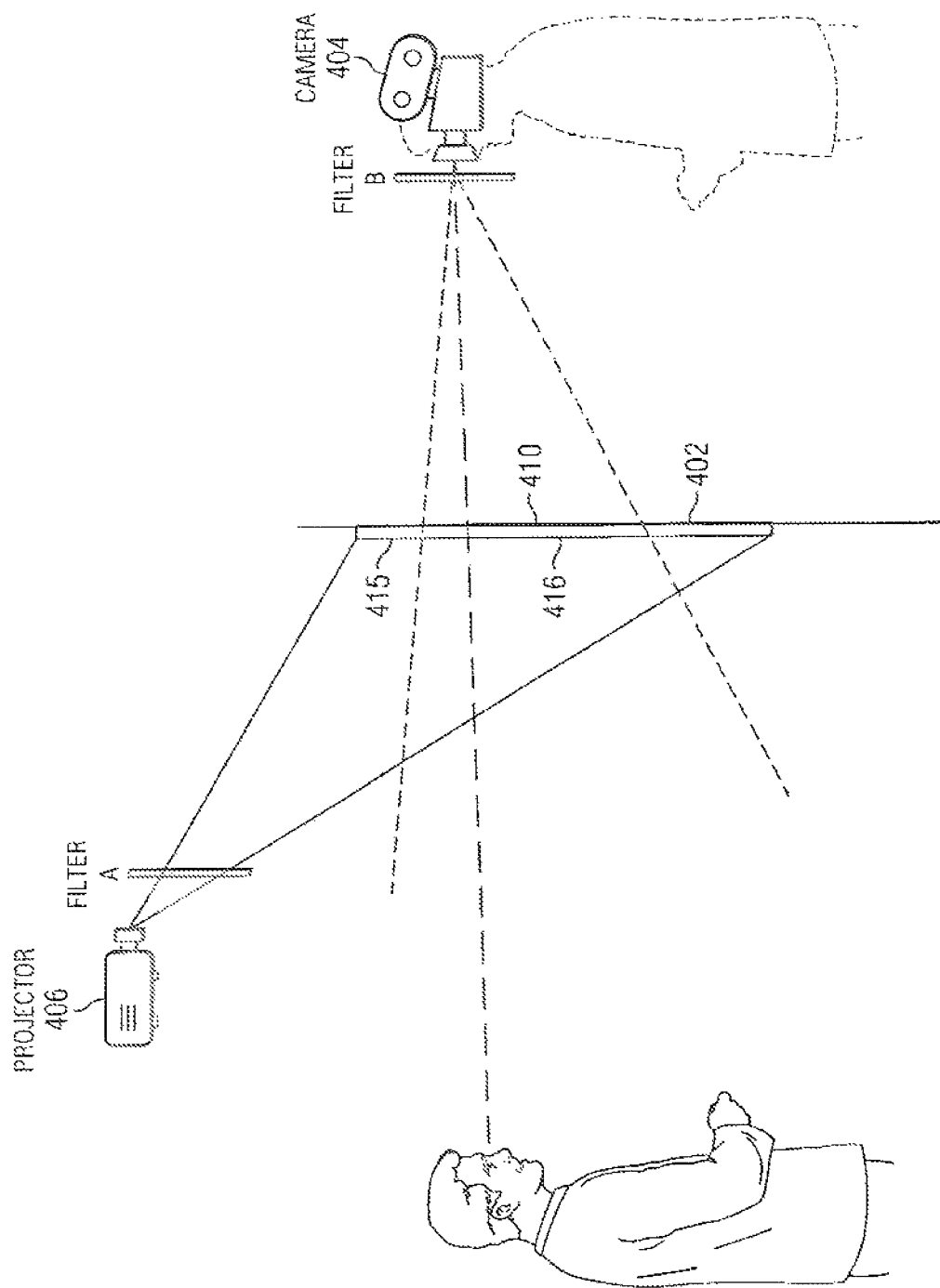
FIG. 10 shows a schematic representation of a seventh visual-collaborative system configured in accordance with one or more embodiments of the present invention.

FIG. 10 shows a schematic representation of a seventh visual-collaborative system configured in accordance with one or more embodiments of the present invention. As previously stated, FIGS. 4-9 are shown implemented using a rear-projection configuration. The visual-collaborative systems shown in FIGS. 10-13 are implemented using a front-projection implementation. The systems are similar in that in both rear and front projection systems project images onto a projection surface where the projected image is visible on the second surface of the display screen. However, the position of the camera and possibly the materials used for the display screen or the display screen configuration may be different.

Similar to the implementation shown in FIG. 4, the embodiment shown in FIG. 10 includes a display screen 402, a camera lens 404, and a projector 406. However, instead of being positioned behind or in the rear of the screen (relative to local participant 1504), the projector 406 in FIG. 10 is positioned in front of the display screen. The projector 406 projects an image onto a projecting surface 415. In this case, the projection surface 415 is the second surface of the display screen 102. The projected image is diffusely reflected off the second surface and can be observed by viewing the second surface.

In FIG. 10 the display screen 402 is a front-projection display screen. In one embodiment, the display screen 402 is comprised of a partially diffusing material that diffuses light striking it within a first and second range of angles. A participant 414 facing the outer second surface 416 of the screen 402 sees the images projected onto the screen 402 from the projector 406. Similar to the embodiments described in FIGS. 4-9, the screen is configured to transmit light scattered from objects facing the second surface 416. In other words, the lens of the camera is positioned to face the first surface 410 so that light from objects facing the second surface 416 pass through the display screen and is captured by the camera 404.

In one embodiment, the display screen is comprised of a material that has a relatively low concentration of diffusing particles embedded within a transparent screen medium. The low concentration of diffusing particles allows a camera 404 to capture an image through the screen (providing the subject is well lit), while it diffuses enough of the light from the projector 406 to form an image on the screen. In an alternative embodiment, the display screen 402 is comprised of a holographic film that has been configured to accept light from the projector 406 within a first range of angles and reflect light that is visible to local participant 1504 within a different range of viewing angles. In some cases, the screen's partially diffusing material may not have sufficient reflective properties to reflect the projected image from the second surface of the display screen. In this case, the display screen includes a half silvered material (not shown) may be positioned directly behind and preferably in contact with the first surface of the display screen. The half silvered mirror will allow transmission of light through the display screen while enhancing the reflectivity of the holographic film.

In the front projection screen embodiment, the light projected onto the second surface within the first range of angles is diffused by the screen and can be observed by viewing the second surface 416 and light scattered off of objects facing the second surface are transmitted through the display screen to the camera. In the front projection embodiment, light from the projector that is transmitted through the display screen can degrade the performance of the system. In order to minimize this degradation, a filter A disposed between the camera and the first surface of the display screen is used to block the light received by the camera that is produced by the projector. In addition, in the preferred embodiment a filter B disposed between the projector's light source and the projection surface (in this case the second surface) where the second filter passes light output by the projector that is blocked by the first filter.

Figure 11:
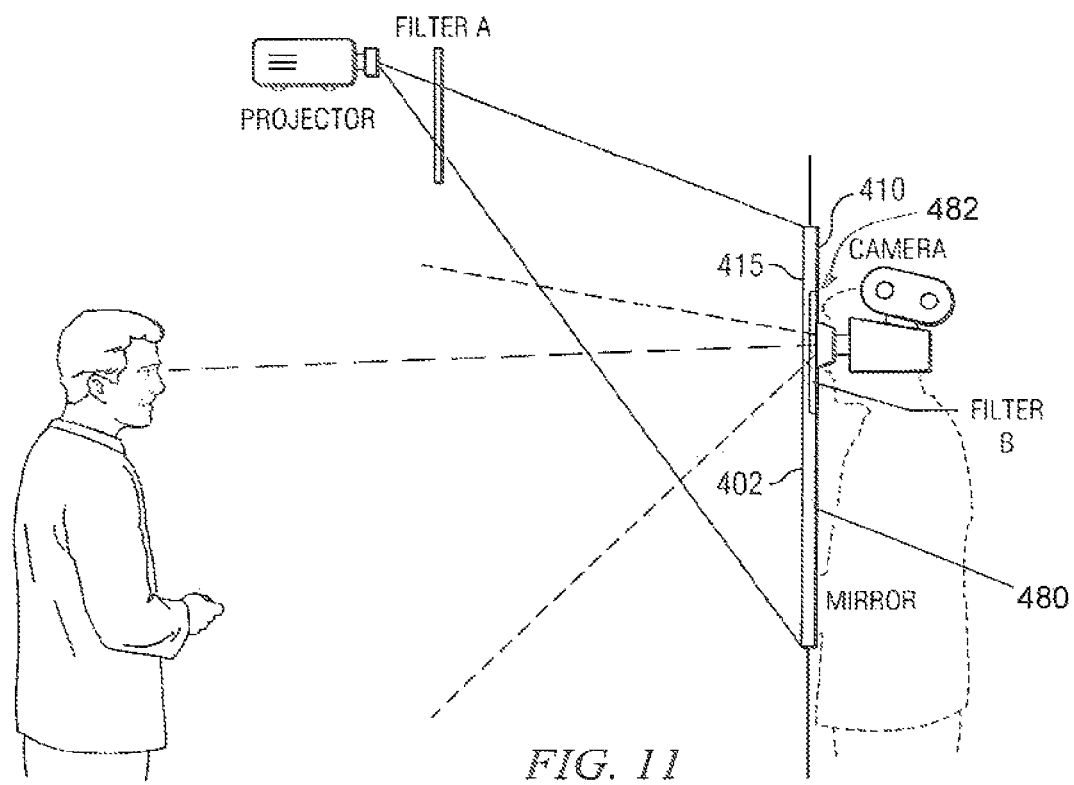
FIG. 11 shows a schematic representation of an eight visual-collaborative system configured in accordance with one or more embodiments of the present invention.
Figure 14:
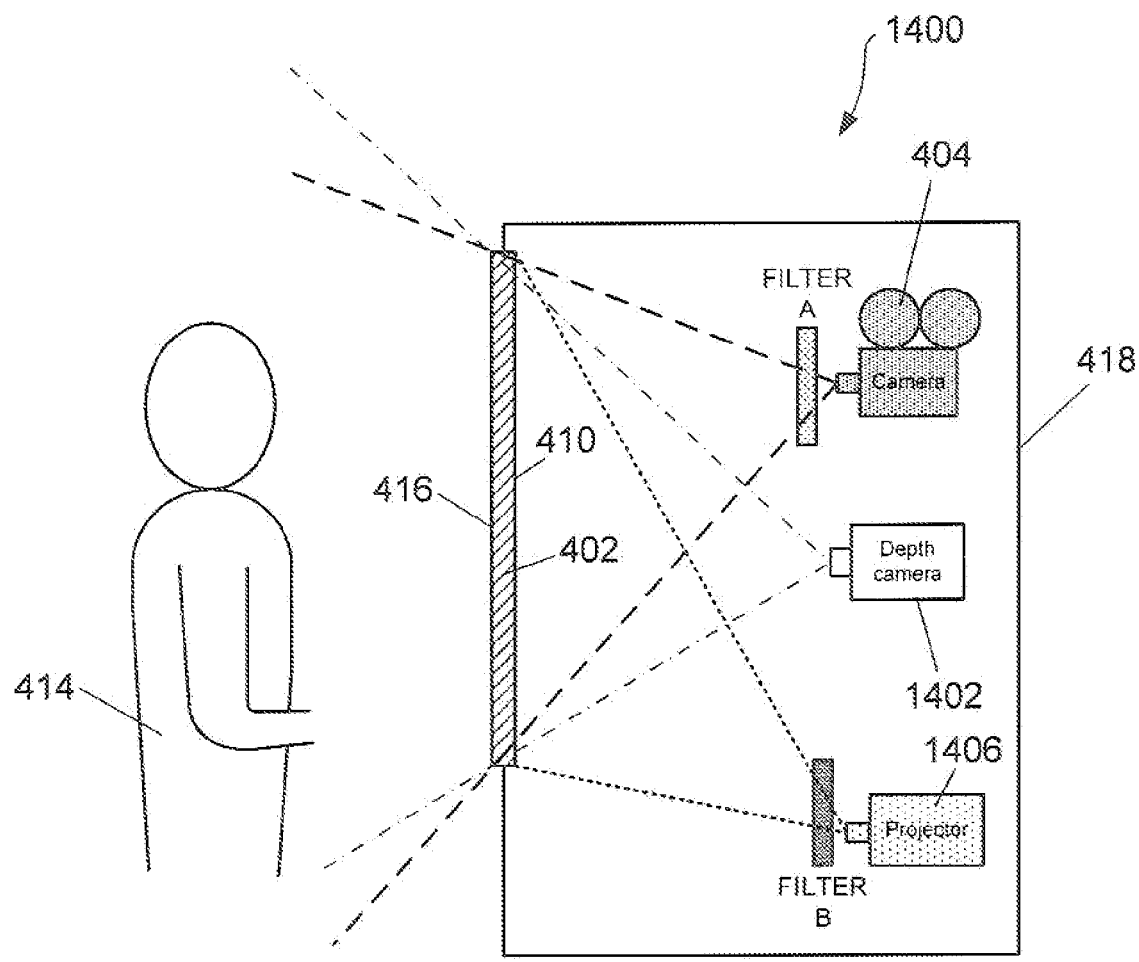
FIG. 14 shows a schematic representation of a visual-collaborative system configured in accordance with one or more embodiments of the present invention.

FIG. 11 shows a schematic representation of an eighth visual-collaborative system configured in accordance with one or more embodiments of the present invention. The implementation of the embodiment shown in FIG. 11, is similar to that of FIG. 10, except for the camera placement and the addition of a mirror 480. The mirror 480 is a completely reflective mirror with an opening 482 for the placement of the filter B. Although the completely reflective mirror improves the projection image, light cannot pass through it. Thus, the camera's position changes. In one embodiment, the camera is positioned so that it is in physical contact with the display system fitter B. Since the camera is not a distance away from the display screen, any writings on the display screen such as is shown in FIG. 14, are not easily viewable.

Figure 12:
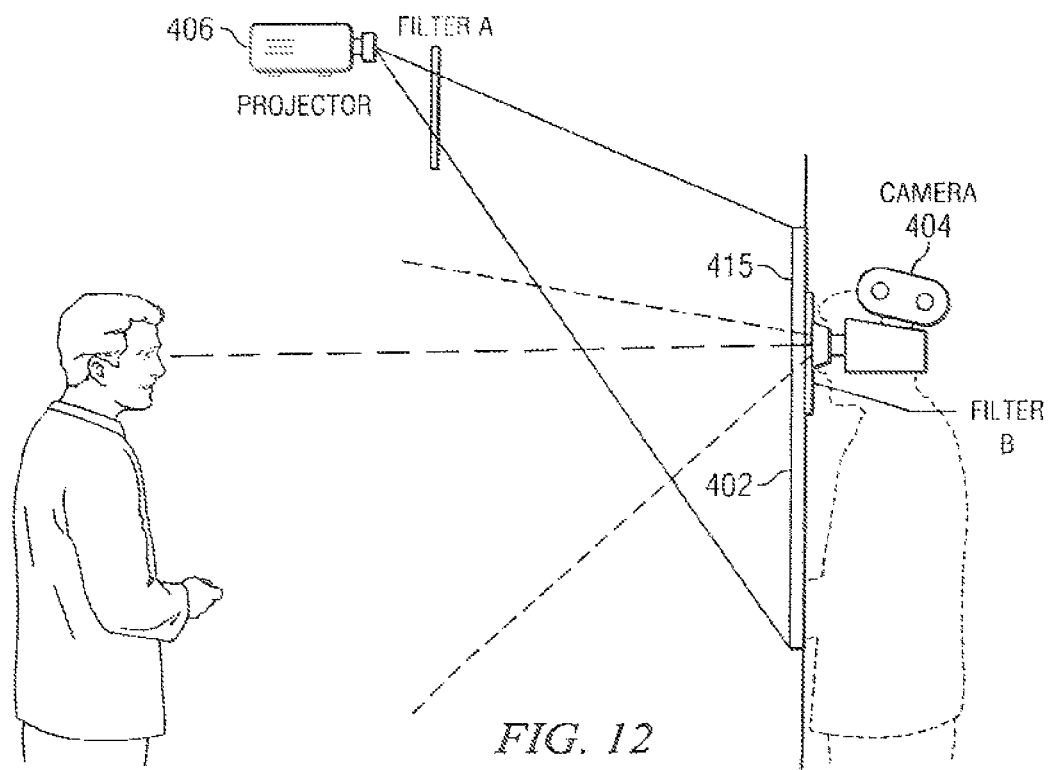
FIG. 12 shows a schematic representation of a ninth visual-collaborative system configured in accordance with one or more embodiments of the present invention.

FIG. 12 shows a schematic representation of a ninth visual-collaborative system configured in accordance with one or more embodiments of the present invention. The implementation of the embodiment shown in FIG. 12 is similar to that shown in FIG. 10. However, instead of the display screen being comprised of a partially diffusing material, the display screen is comprised of standard front-projection screen material. The replacement of the display screen with standard projection screen material decreases costs. However, because the standard projection screen material does not transmit light, the implementation of a collaborative board as shown in FIGS. 14A and 14B is not feasible using this configuration. In the embodiment shown in FIG. 13A-13B, the display screen includes an opening. Similar to the embodiment shown in FIG. 12, a filter A is positioned so that the filter covers the opening. A camera is positioned so that it's lens abuts the filters so that light received by the camera is filtered by filter A.

Figure 13A:
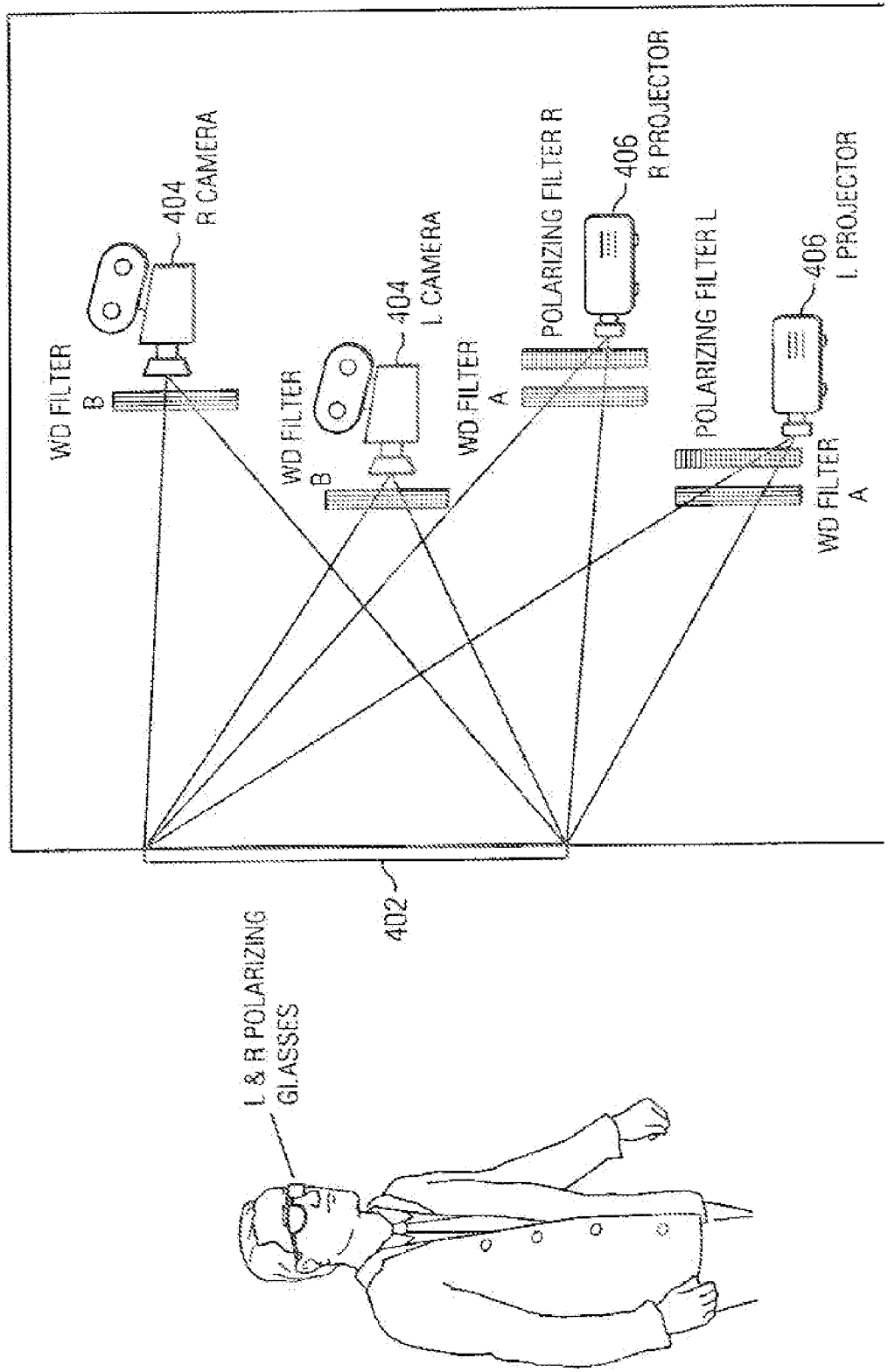
FIGS. 13A-13B show a schematic representation of a tenth visual-collaborative system configured in accordance with one or more embodiments of the present invention
Figure 13B:
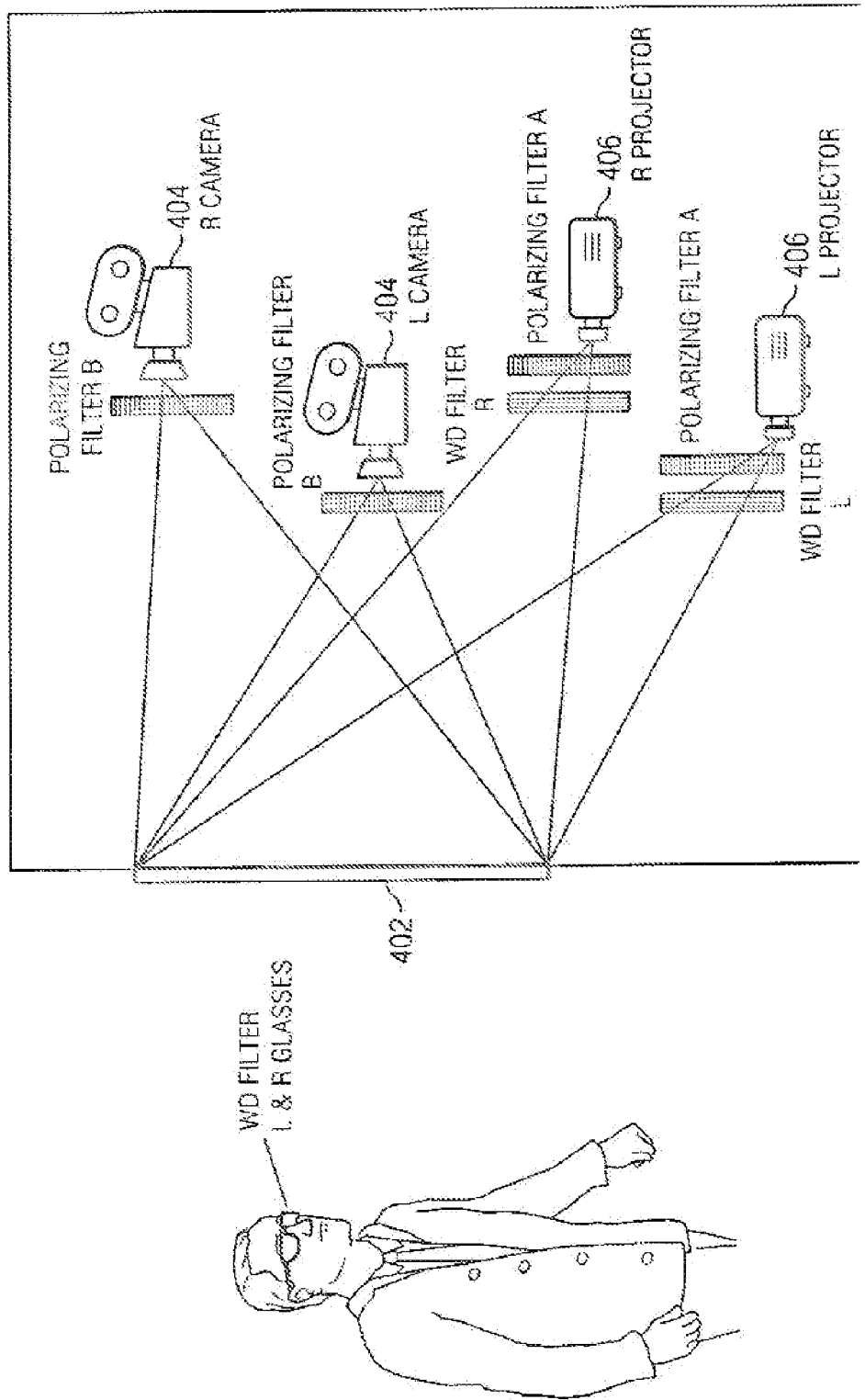

FIGS. 13A-13B shows a schematic representation of a tenth visual-collaborative system configured in accordance with one or more embodiments of the present invention. The representation in FIGS. 13A-13B shows a rear projection screen implementation which is capable of projecting and capturing stereoscopic 3D images. Although the embodiments shown in FIGS. 13A-13B show a rear projection screen implementation, alternatively the embodiments could be used in a front projection screen implementation. In both the rear projection screen and front projection screen implementations, instead of a single projector, two projectors, a right projector and a left projector are used. Although FIGS. 13A and 13B show two cameras, a right camera and a left camera, alternatively a single camera may be used. In the case where two cameras and two projectors are used, the remote user and the projected image will both appear in 3D. In the embodiment where a single camera is used, the remote user will no longer appear in 3D, however, the projected image will still appear in 3D.

Similar to the embodiments described with respect to FIGS. 4-11, light produced from each projector is blocked by the filters that pass light received by each camera. For the 3D implementation to work, the screen material for the embodiments shown in FIGS. 13A-B needs to be polarizing-preserving material. In the embodiment shown in FIG. 13A, each camera has an identical wavelength division filter. For the projector, two different filters (a polarizing filter and a wavelength division filter) are used for each projector. For simplification purposes, the projectors used in the described implementation are the type which result in no polarization of the light output from the projectors.

In the embodiment shown in FIG. 13A, the two wavelength division filters A are identical. The two polarizing filters are of the same type. For example, in one embodiment, the two polarizing filters are circularly polarized filters where one filters is a right circularly polarized filter and the other filter is left circularly polarized filter. In another embodiment, the polarized filters are linearly polarized where the two polarizing filters are preferably orthogonal to each other. For example in one embodiment, for the left projector, a 45 degree polarizing filter is used for the polarizing filter L and a wavelength division color filter is used for WD filter A. For the right projector, a −45 degree polarizing filter is used for polarizing filter R and a wavelength division color filter is used for WD filter A. The two wavelength division color filters used for the Right Projector and the Left Projector should be identical. In the embodiment shown in FIG. 13A, the 3D image can be seen using L&R polarizing glasses.

In the embodiment shown in FIG. 13B, instead of the filters for the cameras being identical wavelength division filters, they are identical polarizing filters B. In the embodiment shown in FIG. 13B, again each projector has two corresponding different filters (a polarizing filter and a wavelength division filter). Again for simplification purposes, the projectors used in the described implementation are the type which result in no polarization of the light output from the projectors.

In the embodiment shown in FIG. 13B, the two filters used in conjunction with the projectors are wavelength division filters that block different components of light. The polarizing filters used in conjunction with the projectors are of the same type. In the embodiment shown in FIG. 13B, the 3D image can be seen using wavelength division L&R glasses.

Embodiments of the present invention include using depth information in order to determine the relative position of each participant, obtain information regarding the relative location of objects, or obtain information about the placement of a participant's hands. In certain embodiments, depth information can be collected by processing the images collected from the left and right cameras 404 described above with reference to FIGS. 13A and 13B. In other words, the left and right cameras 404 can be stereo cameras oriented to provide three-dimensional stereo images of the participants and objects facing the display screen 402.

In other embodiments, a three-dimensional, time-of-flight camera, also called a depth camera, can be included in the visual-collaborative system in order to provide depth information regarding the position of the participant and objects placed in front of the display screen 402. FIG. 14 shows a schematic representation of a visual-collaborative system 1400 configured in accordance with one or more embodiments of the present invention. The system 1400 is similar to the visual-collaborative system 400 shown in FIG. 4 except the system 1400 includes a depth camera 1402. The depth camera 1402 is an imaging system that creates distance data based on the time-of-flight principle. The depth camera 1402 illuminates a scene by generating short light pulses, such as infrared light pulses, that pass throught the screen 402. The depth camera 1402 includes sensors that measure the time elapsed for reflected infrared light pulses to return to the depth camera throught the screen 402. Each pixel of a digital image produced by the depth camera 1402 includes depth information that can be correlated with the images collected by the camera 404 and processed to separate or visually enhance objects based on the object's distance from the depth camera.

For the sake of brevity the depth camera 1402 is described as being incorporated into the visual-collaborative system 400, but embodiments of the present invention are not so limited. In other embodiments, the depth camera 1402 can be included in the other visual-collaborative systems described above with reference to FIGS. 8-12.

Note that in the follow discussion the terms "local participant" and "remote participant" are relative terms used to describe participants taking part in a video conference using the visual-collaborative systems described herein. A participant interacting with another participant located at another site and via a display screen is referred to as a local participant, and the participant displayed on the local participant's display screen is referred to as a remote participant. For example, consider a first participant located at a first site and a second participant located at a second site. The first participant is referred to as a local participant and the second participant is referred to a remote participant when describing embodiments of the present invention from the site or position of the first participant.

In mixing video content projected onto a local participant's display screen, depth information provided by the remote participant can be used to visually enhance or distinguish images of objects located closer to the remote participant's display screen and suppress or remove entirely images of objects located farther from the remote participant's display screen. First consider simple mixing of two objects displayed on the display screen 402 to a local participant. FIGS. 15A-15B show simple mixing of video content from two or more image sources in accordance with one or more embodiments of the present invention. A shared content window 1502 is projected onto the display screen 402 of a local participant 1504 and is displayed in an analogous manner for a remote participant 1506 located at a remote site. Local participant 1504 and remote participant 1506 both see the same document or images displayed within the shared content window, and as shown in the example of FIG. 15A, remote participant 1506 is pointing at a location within the window 1502. FIG. 15B shows a top view of the interaction perceived by local participant 1504. Local participant 1504 perceives the remote participant 1506 as being located behind the screen 402 and pointing to a location within the window 1502. The image of the window 1502 and the portion of the image of remote participant 1506 projected onto the window 1502 are mixed, which can obfuscate the content of the window 1502 for local participant 1504.

In accordance with other embodiments of the present invention, mixing of two or more images based on depth information can be used to visually suppress or remove objects or portions of objects located within the borders of the window 1502 in order to limit obfuscation due to video mixing. FIG. 16 shows a top view of the interaction perceived by local participant 1504 when video content from two or more image sources is mixed based on depth information in accordance with one or more embodiments of the present invention. Video of remote participant 1506 and depth information captured at the remote participant's site can be processed together in projecting both the window 1502 and remote participant 1506 on the display 402. The depth information is used to vary the opacity of the remote participant's image within the borders of the window 1502 based on the remote participant's distance from the remote participant's depth camera or display screen. As shown in the top view of FIG. 16, the window 1502 is displayed on the screen 402. Local participant 1504 perceives remote participant 1506 as standing behind the screen 402 pointing at the window 1502, but the opacity of the window 1502 is segmented according to remote participant's 1506 perceived distance from the window 1502. To local participant 1504, images of objects, such as the remote participant's hand, located within a first distance 1602 are nearly fully reproduced and mixed with the content of the window 1502. In other words, local participant 1504 sees the remote participant's hand faithfully reproduced within the border of the window 1502 and mixed with the content of the window 1502. The image of the window 1502 and objects projected behind the window 1502 are processed so that to local participant 1504 the opacity increases for objects placed within a second distance 1603 from the display screen, and the opacity is further increased for objects placed within a third distance 1604 from the display screen. Objects located beyond the combined distances 1601-1604 can be nearly or totally removed from within the border of the window 1502. Video processing methods to increase opacity can include alpha-blending the object and window images with increasing weight given to the window image, decreasing the color saturation and/or contrast of the object image, and blurring of the object image (removing high frequency components such as edges). The above described methods reduce the object image's interference with the window image.

Figure 17C:
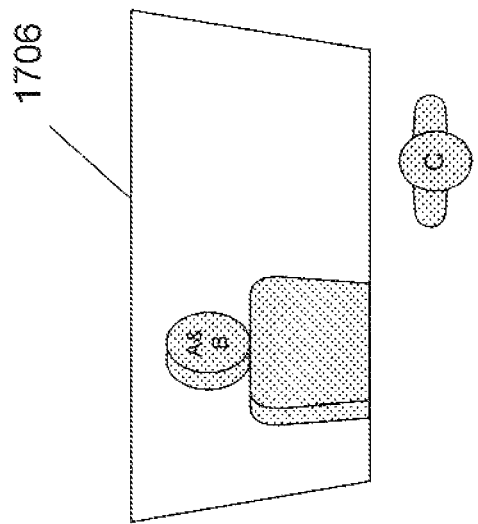
FIGS. 17A-17C each show an arrangement of video-collaboration participants located at a different site in accordance with embodiments of the present invention.
Figure 17B:
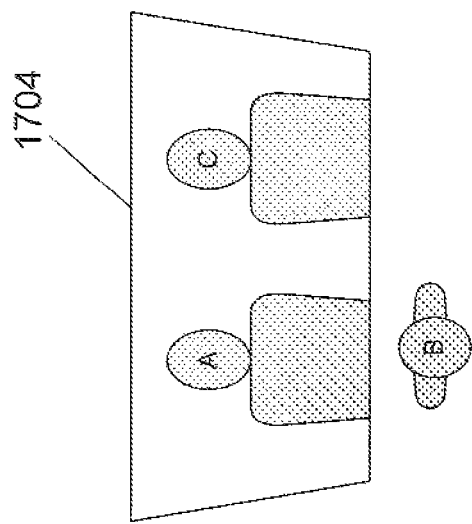
Figure 17A:
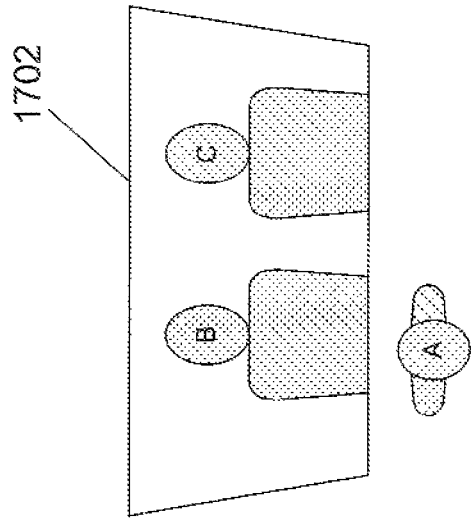

Video-collaboration systems of the present invention can also be used to provide video conferencing for three or more sites. FIGS. 17A-17C each show an arrangement of video conference participants each participant located at a different site in accordance with embodiments of the present invention. Each of FIGS. 17A-17C shows a top view of a participant facing a display screen displaying two other participants participating in the same video conference. As shown in FIGS. 17A-17C, for the sake of convenience each screen appears angled in order to reveal how the participants appear to the local participant. Each site is configured with a camera, depth camera, and projector (not shown) as described above with reference to FIG. 14 or a pair of stereo cameras (not shown) as described above with reference to FIGS. 13A-13B. The camera images collected at each site are used to place the participants within the screens at the other sites. For example, in FIGS. 17A and 17B participants A and B are located to the left of center of their respective screens 1702 and 1704, and in FIG. 17C participant C is located to the right of center of the screen 1706. Thus, in the example of FIG. 17A, participant A sees participant B displayed on the left side of the screen 1702 and sees participant. C displayed on the right side of the screen 1702. In FIG. 17B, participant B sees participant A displayed on the left side of the screen 1704 and sees participant C displayed on the right side of the screen 1704. In certain embodiments, when two or more locations are displayed on a screen, depth information can be used to suppress the background at each site. In other embodiments, that background at each site can be suppressed even when one location is being displayed. For example, returning to FIG. 17A, depth information collected at participant B's site and depth information collected at participant C's site can be used to suppress the backgrounds captured at participant B's and participant C's respective sites so that the participants 13 and C appear to participant A as being located at the same remote site.

However, because the participant's can change positions at their respective sites, there may be instances when the participants will appear to overlap during a video conference. As shown in the example FIG. 17C, because participants A and B are both located to the left of center at their respective sites, the images of participants A and B displayed on screen 1706 overlap and appear mixed. In certain embodiments, depth information may be used to allow one remote participant to be seen as in front of another remote participant, but it may be the case both remote participants are similar distances from their respective depth cameras, in which case their images appear mixed.

Embodiments of the present invention include providing visual cues to overlapping participants enabling the overlapping remote participants to reposition themselves. In particular, each site can send information to the overlapping remote participants that can be used by the overlapping remote participants to reposition themselves. For example, the visual-collaborative system operated by participant C, shown in FIG. 17C, identifies the images of participants A and B as overlapping or mixing and sends information to the participants A and B enabling participants A and B to take appropriate action such as repositioning themselves.

Figure 18:
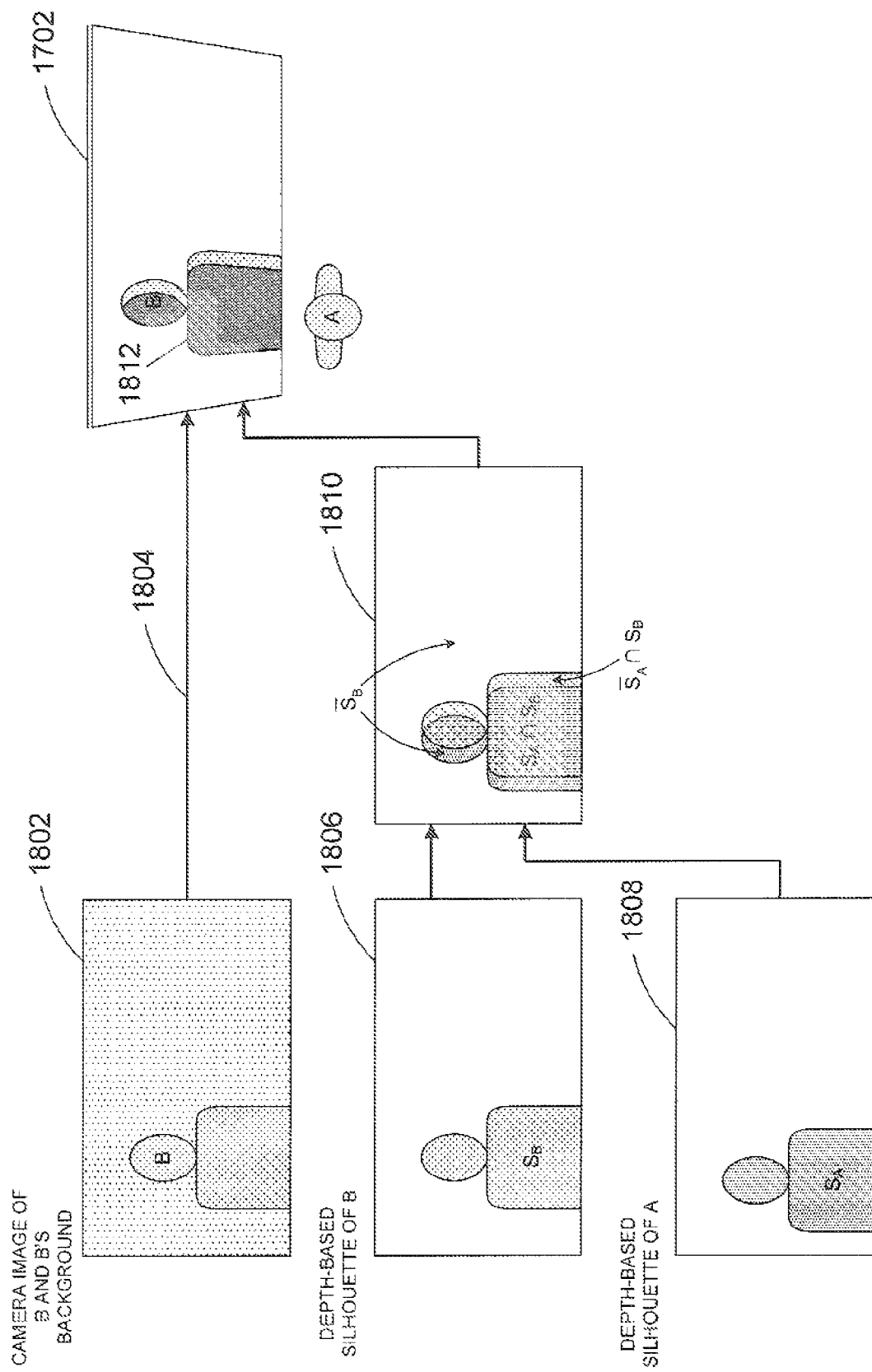
FIG. 18 shows an example of generating a shadow in overlapping images of participants in accordance with one or more embodiments of the present invention.

Constructing overlapping images that enable overlapping participants to reposition themselves can be accomplished as follows. FIG. 18 shows an example of generating a shadow in overlapping images of participants in accordance with one or more embodiments of the present invention. In the example of FIG. 18, image 1802 of participant B is sent 1804 to participant A for viewing. A depth-based silhouette of participant B, $S_B$, 1806 is captured using the depth camera at participant B's site and the silhouette information is also sent to participant A. At participant A's site, a depth-based silhouette of participant A, $S_A$, 1808 is also collected. At participant A's site, the two silhouette's SA and SB are used to define three regions represented in combined depth-based silhouettes 1810. The first region corresponds to participant B's background, $\overline{S}_B$. The second region corresponds to where participant A's silhouette overlaps with participant B's silhouette, $S_A \cap S_B$. The third region corresponds to where participant B's silhouette does not overlap with participant A's silhouette, $\overline{S}_A \cap S_B$. In order to generate the image of participant B shown on participant A's screen 1702, participant B's background $\overline{S}_B$ is suppressed, the portion of participant B's image corresponding to $\overline{S}_A \cap S_B$ is unaltered, and the portion of participant B's image corresponding to $S_A \cap S_B$ is darkened. As a result, participant A sees a shadow 1812 on participant B's image. The same operation can be performed at participant B's site so that participant B is also aware of his/her overlap with participant A.

FIGS. 19A-19C show shadows used to identify overlapping remote participants in accordance with one or more embodiments of the present invention. These shadows can be created from the depth camera data as described above. As shown in FIG. 19A, participant A sees their own shadow displayed on the image of participant B and no shadow displayed on participant C making participant A aware of overlap with participant B but no overlap with participant C. As shown in FIG. 19B, participant B also sees a shadow displayed on the image of participant A and no shadow displayed on participant C making participant B aware of overlap with participant A but no overlap with participant C. In FIG. 19C, participant C does not see a shadow displayed on either participant A or participant B. Thus, participant C knows that he/she does not overlap with either participant A or B. Note that the shadows are also generated to provide participants A and B with visual cues as to how they can adjust their positions with respect one another. For example, in FIG. 19A, participant A sees the shadow displayed on participant B appearing primarily on the left side of participant B's image indicating that participant A is located farther from the center than participant B. In FIG. 19B, participant B sees the shadow displayed on participant A appearing primarily on the right side of participant. A's image indicating that participant B is located closer to the center than participant. A.

FIGS. 19D-19F show participants repositioned to avoid overlap in accordance with one or more embodiments of the present invention. In FIG. 19D, participant A has moved farther to the left of center, and in FIG. 19C, participant B has moved toward the center. Participants A and B response to the visual cues provided by the shadows enable participants A and B to readjust their positions accordingly so that images of participants A and B do not substantially overlap, as shown in FIG. 19F.

Embodiments of the present invention include providing visual cues to a participant that overlap with a shared content window displayed on both the local participant's display screen and the remote participant's display screen. The visual cue enables the overlapping participant to change positions. FIGS. 20A-20B each show an arrangement of two video conference participants located at different sites in accordance with embodiments of the present invention. Each Figure shows a top view of a participant facing a display screen displaying the other participant and a shared content window 2002. Each site is configured with a camera, depth camera, and projector (not shown) as described above with reference to FIG. 14 or a pair of stereo cameras (not shown) as described above with reference to FIGS. 13A-13B. As shown in FIG. 20A, participant B has moved behind the window 2002 so that participant A can only see a portion of participant B's face. As shown in FIG. 20B, a shadow image of participant B is generated within the window at participant B's site enabling participant B to recognize that participant B appears to have stepped behind the window 2002 from participant A's position. Note that the location of the shadow placed on the window 2002 provides participant B with a visual cue as to how participant B can adjust his/her position with respect to the location of the window 2002. FIGS. 21A-21B show participant. B repositioned to avoid overlap with the window 2002 in accordance with one or more embodiments of the present invention. In FIG. 21A, participant B has moved farther to the right and appears in FIG. 21B to have moved out from behind the window 2002.

Shadows generated from depth-based silhouettes can also be used as a visual cue in other situations where it is desirable to induce the participants to re-orient themselves with respect to the system. For example, they could be used to induce participants to align themselves with respect to the system's cameras so as to create better eye-contact.

Note that in other embodiments other kinds of visual cues can be used. For example, arrows directing participants to move either left or right can be used as visual cues for instructing participants to change positions.

Figures 22A, 22B:
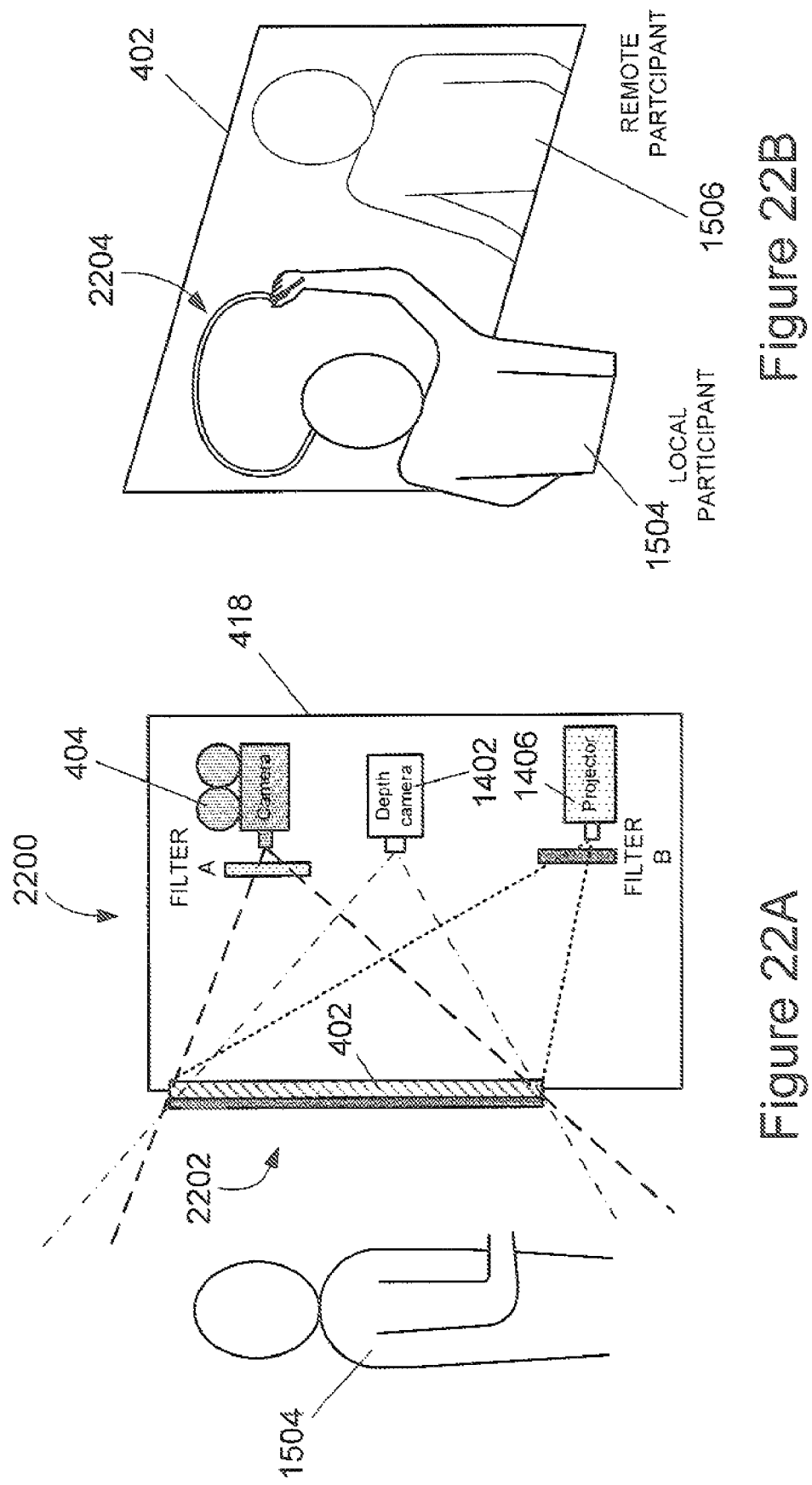
FIGS. 22A-22B show a visual-collaborative system configured with a touchscreen and operated in accordance with one or more embodiments of the present invention.

FIG. 22A shows a visual-collaborative system 2200 configured with a touchscreen 2202 in accordance with one or more embodiments of the present invention. The system 2200 is similar to the system 1400 except the display screen 402 includes a touchscreen 2202. The touchscreen 2202 is configured to detect the presence and location of the local participant's contact within the display area of the touchscreen. For example, FIG. 22B shows a snapshot of local participant 1504 drawing, an arc 2204 on the touchscreen 2202 using a stylus. The touchscreen identifies the coordinate locations of the markings comprising the arc 2204 and projects the markings on the local participant's display screen 402 as the local participant generates the arc and simultaneously sends the coordinates of the arc as it is being created to the remote participant 1506 so that the arc 2204 can be displayed on the display screen of the remote participant 1506. In other words, the local participant's markings are reproduced as if the local participant was drawing at a white board that both the local and the remote participant are standing in front of the touchscreen 2202 can be any suitable touchscreen. For example, in certain embodiments, the touch screen 2202 can be configured with an array of infrared light-emitting diodes disposed along two adjacent bezel edges of the display screen 402. Photodetectors are disposed along the two opposite bezel edges. The light-emitting diode and photodetector pairs create a grid of light beams across the display. An object, such as the local participant's finger or stylus, that touches the display screen interrupts the light beams, causing a measured decrease in light at the corresponding photodetectors. The measured photodetector outputs can be used to locate a contact-point coordinate. In other embodiments, the touchscreen 2202 can be implemented as a capacitive touchscreen panel comprising an insulator, such as glass, coated with a transparent conductor, such as indium tin oxide. Touching the surface of the touchscreen results in a distortion of the local electrostatic field, which is measured as a change in capacitance at a coordinate location within the touchscreen 2202. In other embodiments, the touchscreen 2202 can be a resistive touchscreen panel including two thin, metallic, electrically conductive layers separated by a narrow gap. When the local participant's finger or stylus presses down on a point on the touchscreen's outer surface, the two metallic layers make contact at that point. The two panels behave like a pair of voltage dividers with connected outputs creating a change in the electrical current which is registered as a contact event at a particular coordinate location on the touchscreen.

Embodiments of the present invention are not limited to the three examples of touchscreens described above. For the sake of simplicity, the three kinds of touchscreens described above are included just to mention a few of the many different kinds of touchscreens that are suitable for the visual-collaborative system 2200 described above with reference to FIG. 22.

Returning to FIG. 22B, in order to enhance the visibility of the marks produced by the local participant 1504, the marks can be enhanced by surrounding the edges of the marks with a dark shadow. For example, as shown in FIG. 22B, the arc 2204 generated by local participant 1504 appears on the display screen as a white curve surrounded by a darker shadow that can be seen by both the local participant 1504 and the remote participant 1506.

Figure 23A:
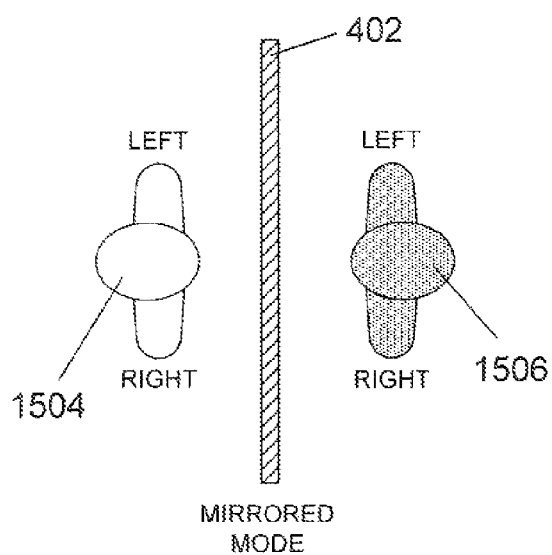
FIGS. 23A-23C show visual collaboration between participants in a mirror mode in accordance with one or more embodiments of the present invention.
Figure 23B:
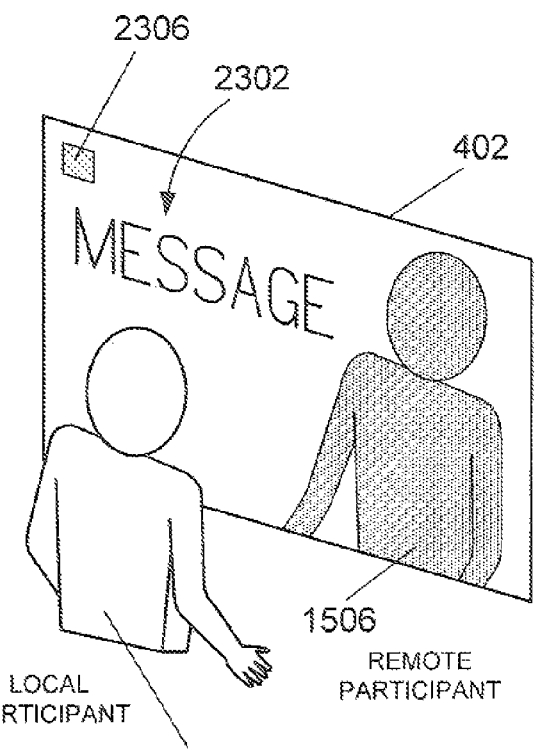
Figure 23C:
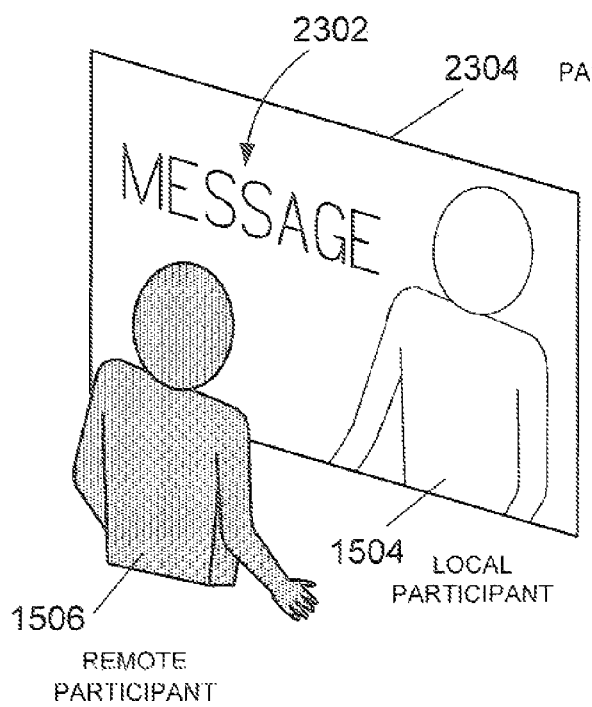

Visual collaboration embodiments of the present invention are typically performed in a mirror mode. FIGS. 23A-23C show visual collaboration between local participant 1504 and remote participant 1506 in the mirror mode in accordance with one or more embodiments of the present invention. As shown in the top view of FIG. 23A, in the mirrored mode, the image of remote participant 1506 is displayed for the local participant so that the left side of the local participant is opposite the left side of the remote participant and the right side of the local participant is opposite the right side of the remote participant. The mirrored mode also mirrors messages displayed on the display screens of the respective participants so the messages appear correctly oriented on each participant's display screen. For example, as shown in FIG. 23B, a correctly oriented message 2302 is displayed on the local participant's display screen 402 so that the local participant can read to the message. The mirrored mode enables the same messages 2302 to be displayed on the remote participant's display screen 2304 with the correct orientation, as shown in FIG. 23C.

Figure 24B:
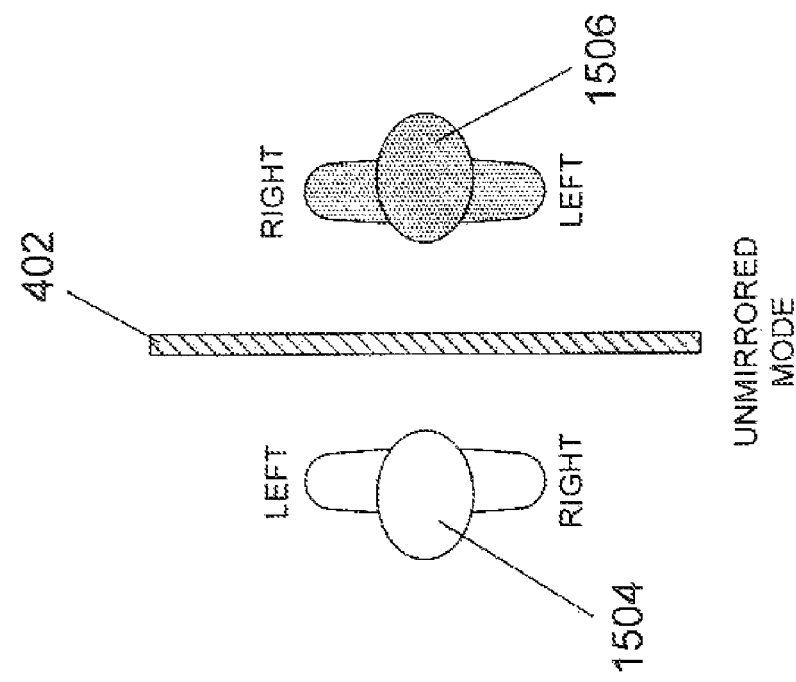
FIGS. 24A-24B show examples of mirrored and unmirrored images in accordance with one or more embodiments of the present invention.
Figure 24A:
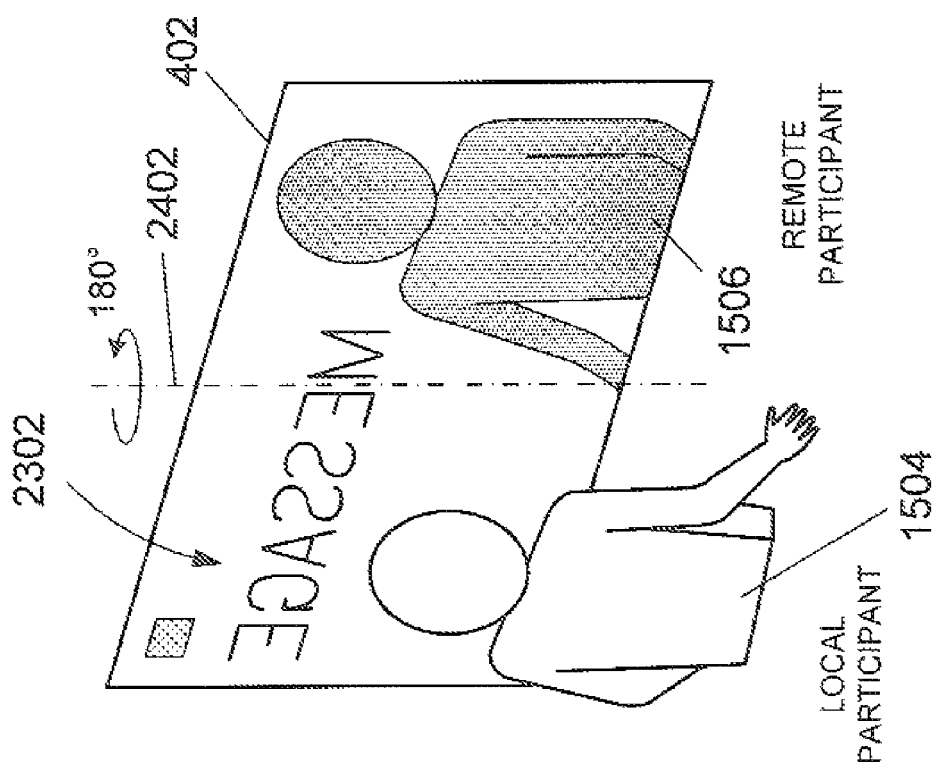

The visual-collaborative system 2200 enables participants to switch between the mirrored mode and an unmirrored mode. For example, as shown in FIG. 23B, the display screen 402 can be projected on the touchscreen 2202 with a mirrored/unmirrored icon 2306 located in the corner of the display screen 402. FIG. 24A shows an example of an unmirrored image displayed on the display screen 402 in accordance with one or more embodiments of the present invention. When the local participant contacts the icon 2306, shown in FIG. 23B, the image displayed to local participant 1504 is unmirrored by flipping or rotating the image 180 degrees about a vertical axis 2402 shown in FIG. 24A. Switching to the unmirrored mode reverses the orientation of the message 2302 so that the message appears backwards to local participant 1504. As shown in the top view of FIG. 24B, in the unmirrored mode, the image of remote participant 1506 is displayed so that the left side of remote participant 1506 is opposite the right side of local participant 1504 and the left side of local participant 1504 is opposite the right side of remote participant 1506. Note that mirroring or unmirroring an image is a local operation. In other words, although the image appears unmirrored to the local participant 1504, the image displayed for the remote participant remains mirrored until the remote participant performs the same operation.

Figure 25:
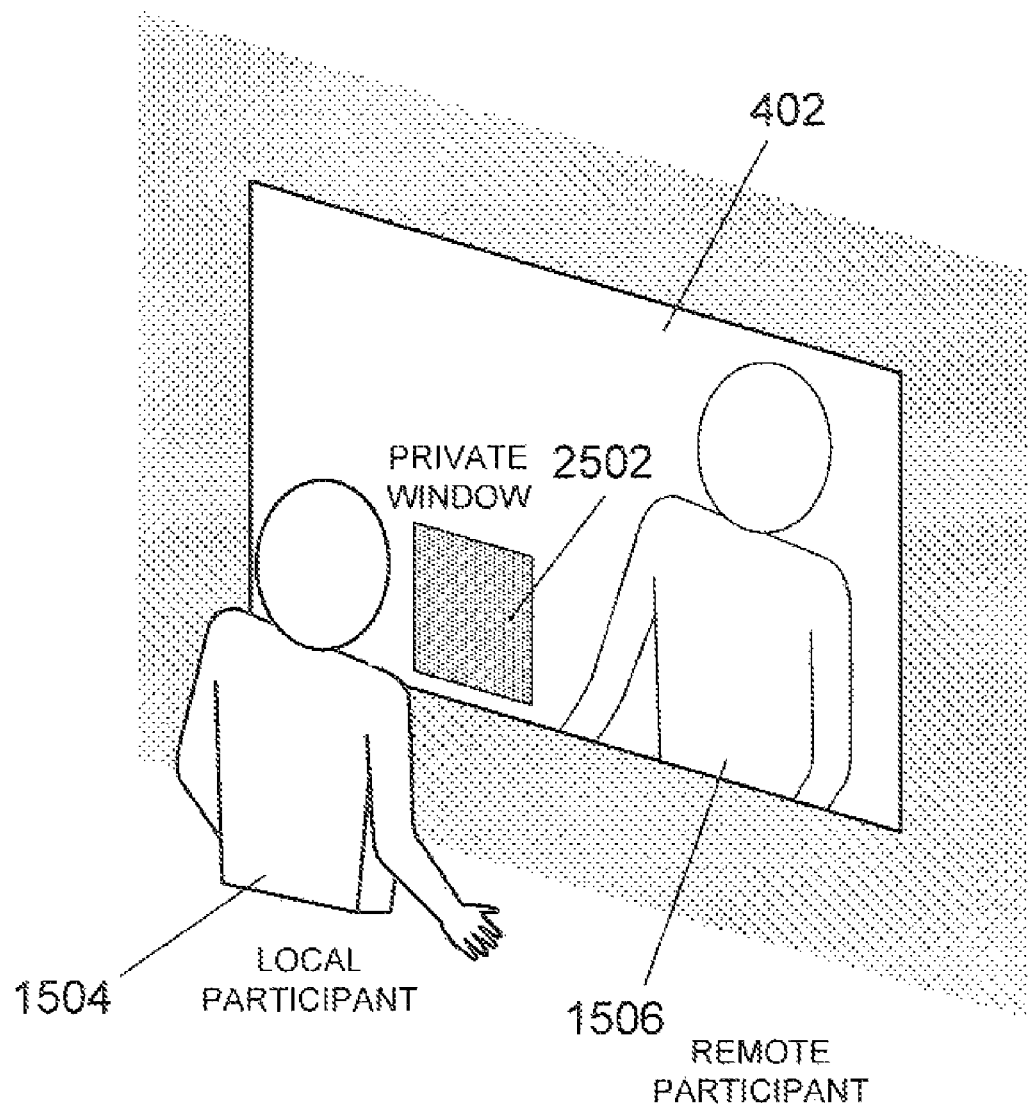
FIG. 25 shows an example of a private window displayed on a display screen in accordance with one or more embodiments of the present invention.

Embodiments of the present invention include enabling participants to bring up one or more private windows within the display screen. The one or more private windows can be viewed only by the local participant and cannot be viewed by the remote participants. FIG. 25 shows an example of a private window 2502 displayed on the display screen 402 of local participant 1504 in accordance with one or more embodiments of the present invention. The private window 2502 cannot be viewed by the remote participant 1506. The private window can be an e-mail window, a confidential document, a web browser, or any other graphic user interface.

Figure 26:
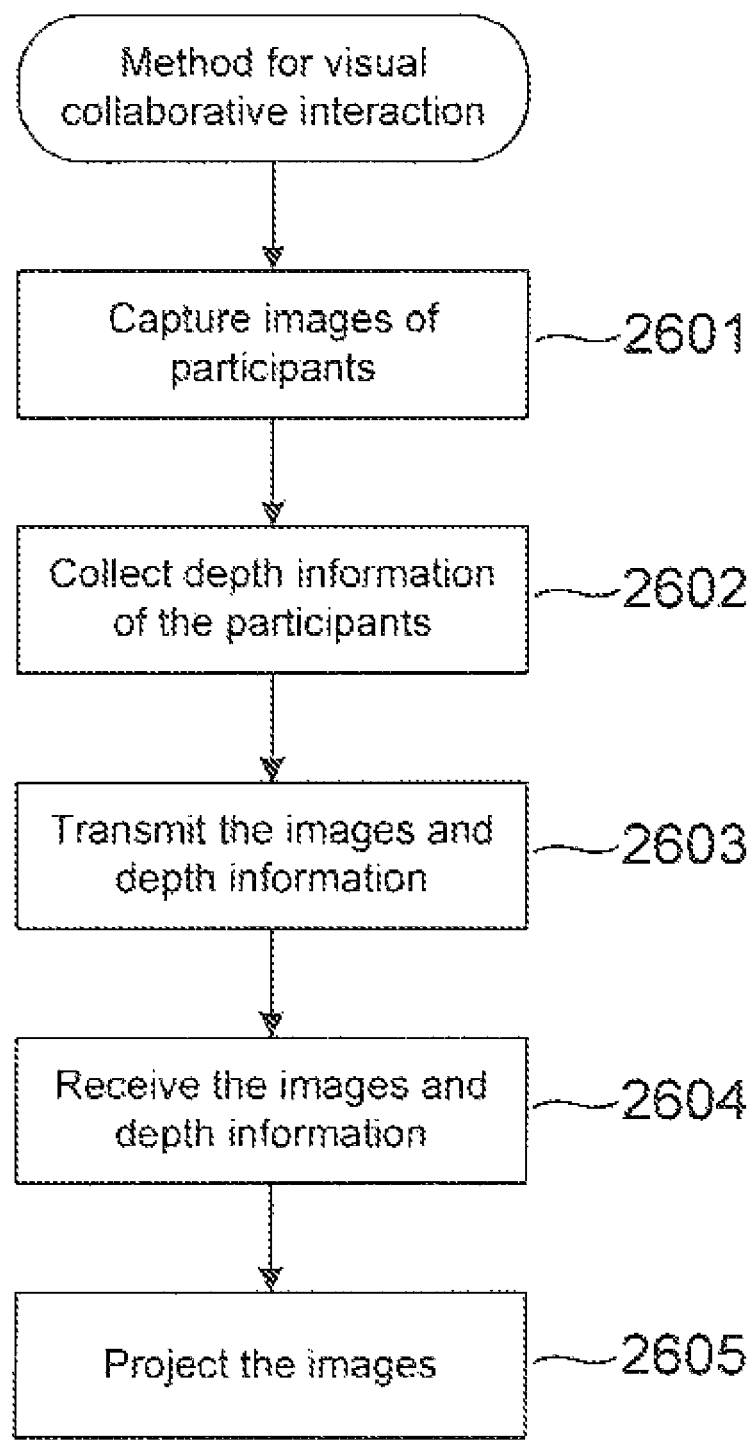
FIG. 26 shows a flow diagram of a method for establishing visual-collaborative interaction in accordance with one or more embodiments of the present invention.

FIG. 26 shows a flow diagram of a method for establishing visual collaborative interaction in accordance with one or more embodiments of the present invention. Steps 2601-2605 do not have to be completed in any particular order and can be performed at the same time. In step 2601, images of one or more local participants are captured using one or more cameras as described above with reference to FIGS. 4 and 6-14. In step 2602, depth information of the one or more local participants is collected using either stereo cameras or a depth camera as described above with reference to FIGS. 13 and 14. In step 2603, the images and depth information associated with the one or more local participants is transmitted to one or more remote participants. In step 2604, the local participant receives images and depth information from the one or more remote participants. In step 2605, the image of the one or more remote participants is displayed on a display screen at the local participant's site based on the depth information as described above with reference to FIGS. 15-25.

Figure 27:
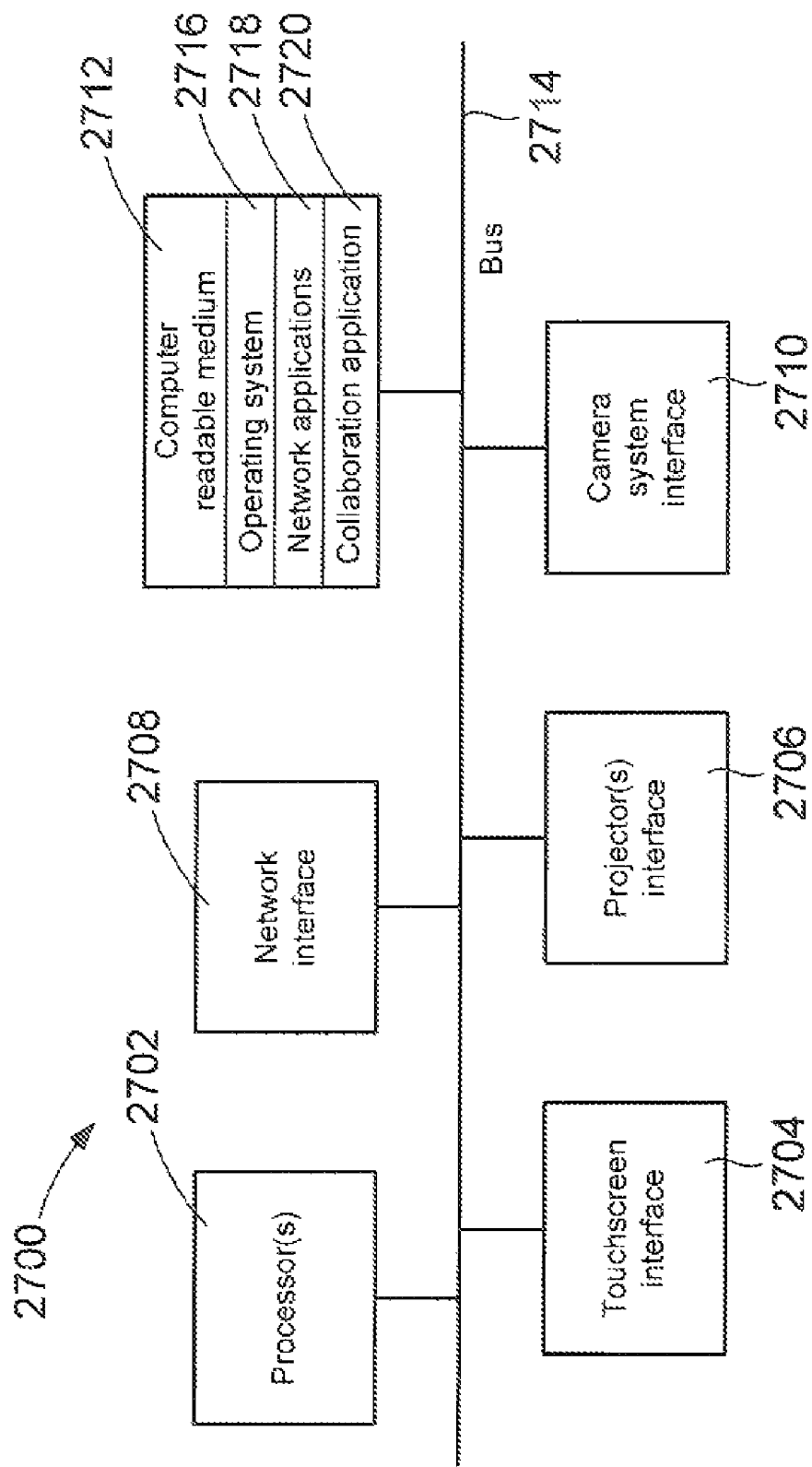
FIG. 27 shows a schematic representation of a computing device configured in accordance with one or more embodiments of the present invention.

In general, the methods employed to establish visual collaboration between a local participant and one or more remote participants can be implemented on a computing device, such as a desktop computer, a laptop, or any other suitable computational device. FIG. 27 shows a schematic representation of a computing device 2700 configured in accordance with one or more embodiments of the present invention. The device 2700 includes one or more processors 2702, such as a central processing unit; a touchscreen interface 2704; one or more projectors interfaces 2706; a network interface 2708, such as a Local Area Network LAN, a wireless 802.11x LAN, a 3G mobile WAN or a WiMax WAN; a camera system interface 2710; and one or more computer-readable mediums 2712. Each of these components is operatively coupled to one or more buses 2714. For example, the bus 2714 can be an EISA, a PCI, a USB, a FireWire, a NuBus, or a PDS.

The computer readable medium 2712 can be any suitable medium that participates in providing instructions to the processor 2702 for execution. For example, the computer readable medium 2712 can be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 2712 can also store other software applications, including word processors, browsers, email, Instant Messaging, media players, and telephony software.

The computer-readable medium 2712 may also store an operating system 2716, such as Mac OS®, Microsoft Windows®, Unix®, or Linux®; network applications 2718; and a collaboration application 2720. The operating system 2716 can be multi-user, multiprocessing, multitasking, multi-threading, real-time and the like. The operating system 2716 can also perform basic tasks such as recognizing input from input devices, such as a keyboard or a keypad; sending output to the projector interface 2706; keeping track of files and directories on medium 2712; controlling peripheral devices, such as disk drives, printers, camera systems; and managing traffic on the one or more buses 2714. The network applications 2718 include various components for establishing and maintaining network connections, such as software for implementing communication protocols including TCP/IP, HTTP, Ethernet, USB, and FireWire.

The collaboration application 2720 provides various software components for establishing visual collaboration with one or more remote participants, as described above. In certain embodiments, some or all of the processes performed by the application 2720 can be integrated into the operating system 2716. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for establishing a collaborative interaction between a local participant and one or more remote participants, the method comprising:
    capturing images of the local participant in front of a display screen;
    collecting depth information of the local participant located in front of the display screen;
    transmitting the images and depth information of the local participant to the one or more remote participants;
    receiving images and depth information of the one or more remote participants; and
    projecting the images of the one or more remote participants on the display screen based on the depth information of the remote participants;
    wherein projecting the images of the one or more remote participants on the display screen based on the depth information of the remote participants further comprises:
    identifying two or more overlapping remote participants; and
    for each overlapping remote participant, generating a visual cue appearing on the overlapping remote participant's display screen, the visual cue including information that enables the overlapping remote participant to change positions to avoid overlapping with another remote participant.

2. The method of claim 1 wherein capturing the images of the local participant further comprises positioning the display screen between the local participant and one or more cameras so that the images of the local participant can be captured through the display screen.

3. The method of claim 1 wherein collecting depth information of the local participants further comprises:
    capturing stereo images of the local participant through the display screen; and
    processing the stereo images to obtain the depth information of the local participant.

4. The method of claim 1 wherein collecting depth information of the local participant further comprises positioning a depth camera to collect the depth information of the local participant through the display screen.

5. The method of claim 1 wherein collecting the depth information of the local participant further comprises determining coordinate locations of the local participant image and position in front of the display screen.

6. The method of claim 1 wherein projecting the images of the one or more remote participants on the display screen based on the depth information of the remote participants further comprises:
    displaying a shared content window within the display screen, the window appearing in the display screen of each participant; and displaying the images of the one or more remote participants to appear behind the window wherein the opacity of the window increases based on the depth information associated with the one or more remote participants.

7. The method of claim 6 wherein displaying the images of the one or more remote participants to appear behind the window further comprises:
   decreasing the transparency of the window;
   reducing color saturation of the window; and
   blurring objects that appear located, behind the window.

8. The method of claim 1 wherein the visual cue further comprises a shadow.

9. The method of claim 1 further comprising:
   detecting contact made by the local participant on the display screen;
   displaying markings corresponding to the contact on the display screen; and
   transmitting the markings to the one or more remote participants so that the markings can be displayed on associated display screens.

10. The method of claim 9 wherein the markings include a surrounding relatively darker shadow.

11. The method of claim 1 further comprising generating a private window within the display screen, the private window viewed exclusively by the local participant.

12. A method for establishing a collaborative interaction between a local participant and one or more remote participants, the method comprising:
   capturing images of the local participant in front of a display screen;
   collecting depth information of the local participant located in front of the display screen;
   transmitting the images and depth information of the local participant to the one or more remote participants;
   receiving images and depth information of the one or more remote participants; and
   projecting the images of the one or more remote participants on the display screen based on the depth information of the remote participants;
   wherein projecting the images of the one or more remote participants on the display screen based on the depth information of the remote participants further comprises:
   identifying when the image of the one or more remote participants is projected behind a shared content window displayed on the display screen; and
   generating a visual cue directing the one or more remote participants to change positions to avoid being projected behind the window.

13. The method of claim 12 wherein the visual cue further comprises a shadow.

14. The method of claim 12 wherein capturing the images of the local participant further comprises positioning the display screen between the local participant and one or more cameras so that the images of the local participant can be captured through the display screen.

15. The method of claim 12 wherein collecting depth information of the local participants further comprises:
   capturing stereo images of the local participant through the display screen; and
   processing the stereo images to obtain the depth information of the local participant.

16. The method of claim 12 wherein collecting depth information of the local participant further comprises positioning a depth camera to collect the depth information of the local participant through the display screen.

17. A method for establishing a collaborative interaction between a local participant and one or more remote participants, the method comprising:
   capturing images of the local participant in front of a display screen;
   collecting depth information of the local participant located in front of the display screen;
   transmitting the images and depth information of the local participant to the one or more remote participants;
   receiving images and depth information of the one or more remote participants;
   projecting the images of the one or more remote participants on the display screen based on the depth information of the remote participants, wherein projecting the images of the one or more remote participants on the display screen further comprises projecting mirror images of the one or more remote participants displayed on the display screen; and
   detecting a signal made by the local participant, the signal unmirroring the mirror image of the one or more participants displayed on the display screen.

18. The method of claim 17 wherein capturing the images of the local participant further comprises positioning the display screen between the local participant and one or more cameras so that the images of the local participant can be captured through the display screen.

19. The method of claim 17 wherein collecting depth information of the local participants further comprises:
   capturing stereo images of the local participant through the display screen; and
   processing the stereo images to obtain the depth information of the local participant.

20. The method of claim 17 wherein collecting depth information of the local participant further comprises positioning a depth camera to collect the depth information of the local participant through the display screen.

* * * * *

UNITED STATES PATENT AND TRADEMARK OFFICE
CERTIFICATE OF CORRECTION

PATENT NO. : 8,390,718 B2
APPLICATION NO. : 12/694743
DATED : March 5, 2013
INVENTOR(S) : Ian N. Robinson et al.

Page 1 of 1

It is certified that error appears in the above-identified patent and that said Letters Patent is hereby corrected as shown below:

In the Claims

In column 19, line 10, in Claim 7, delete "located," and insert -- located --, therefor.

Signed and Sealed this
Twelfth Day of November, 2013

Teresa Stanek Rea
*Deputy Director of the United States Patent and Trademark Office*